(12) United States Patent
Tjader

(10) Patent No.: US 12,247,688 B2
(45) Date of Patent: *Mar. 11, 2025

(54) LUBRICATION SYSTEM FOR PIPE BURSTING

(71) Applicant: TT Technologies, Inc., Aurora, IL (US)

(72) Inventor: Michael Tjader, New Richmond, WI (US)

(73) Assignee: TT Technologies, Inc., Aurora, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/108,834

(22) Filed: Feb. 13, 2023

(65) Prior Publication Data

US 2023/0341073 A1 Oct. 26, 2023

Related U.S. Application Data

(63) Continuation of application No. 17/540,806, filed on Dec. 2, 2021, now Pat. No. 11,578,830, which is a continuation of application No. 16/158,998, filed on Oct. 12, 2018, now Pat. No. 11,209,111, which is a continuation of application No. 15/149,793, filed on May 9, 2016, now Pat. No. 10,119,645, which is a
(Continued)

(51) Int. Cl.
*F16L 55/165* (2006.01)
(52) U.S. Cl.
CPC .................................. *F16L 55/1658* (2013.01)
(58) Field of Classification Search
CPC ..... F16L 55/1658; F16L 55/18; F16L 55/165; E02F 3/06; E03F 2003/065; H02G 1/081; H02G 1/08
See application file for complete search history.

(56) References Cited

U.S. PATENT DOCUMENTS

| 4,911,579 A | 3/1990 | Lutz et al. |
| 5,078,546 A | 1/1992 | Fisk et al. |

(Continued)

OTHER PUBLICATIONS

"U.S. Appl. No. 12/898,376, Advisory Action mailed Jan. 6, 2015", 3 pgs.
(Continued)

*Primary Examiner* — Benjamin F Fiorello
(74) *Attorney, Agent, or Firm* — Schwegman Lundberg & Woessner, P.A.

(57) ABSTRACT

A pipe pulling lubrication apparatus includes a pipe anchor having an anchor body. The anchor body includes a first coupling feature near an anchor body proximal portion and a distal pipe coupling feature near an anchor body distal portion. The distal pipe coupling feature is configured to couple and position a replacement pipe exterior surface near an anchor body exterior surface. The lubrication apparatus further includes a lubrication system including a lubricant conduit extending within the anchor body from the distal pipe coupling feature toward an anchor body intermediate portion between the first coupling feature and the distal pipe coupling feature. The lubrication system includes a lubricant distributor having one or more lubricant passages extending from the lubricant conduit toward the anchor body exterior surface, the lubricant distributor is configured to deliver a lubricant to the replacement pipe exterior surface.

15 Claims, 20 Drawing Sheets

Related U.S. Application Data continuation of application No. 12/898,376, filed on Oct. 5, 2010, now Pat. No. 9,334,999.

(60) Provisional application No. 61/248,762, filed on Oct. 5, 2009.

(56) References Cited

U.S. PATENT DOCUMENTS

| | | |
|---|---|---|
| 5,439,320 A | 8/1995 | Abrams |
| 5,482,404 A | 1/1996 | Tenbusch, II et al. |
| 5,782,311 A | 7/1998 | Wentworth |
| 6,098,708 A | 8/2000 | Jenne |
| 6,244,783 B1 | 6/2001 | Puttmann et al. |
| 6,382,877 B1 | 5/2002 | Hodgson |
| 6,568,488 B2 | 5/2003 | Wentworth et al. |
| 6,742,932 B2 * | 6/2004 | Eisenberg .......... F16C 33/6622 384/396 |
| 6,755,593 B2 | 6/2004 | Wentworth et al. |
| 6,761,507 B2 | 7/2004 | Wentworth et al. |
| 6,913,091 B2 | 7/2005 | Wentworth et al. |
| 7,384,214 B2 | 6/2008 | Tjader |
| 8,328,468 B2 | 12/2012 | Tjader |
| 8,414,225 B2 | 4/2013 | Tjader |
| 9,334,999 B2 | 5/2016 | Tjader |
| 10,119,645 B2 | 11/2018 | Tjader |
| 11,578,830 B2 | 2/2023 | Tjader |
| 2002/0114671 A1 | 8/2002 | Wentworth et al. |
| 2004/0228691 A1 | 11/2004 | Tjader |
| 2007/0036613 A1 | 2/2007 | Tjader |
| 2007/0048091 A1 | 3/2007 | Tjader |
| 2009/0285635 A1 | 11/2009 | Tjader |
| 2010/0178113 A1 | 7/2010 | Tjader |
| 2011/0079469 A1 | 4/2011 | Tjader |
| 2011/0081205 A1 | 4/2011 | Tjader |
| 2011/0081206 A1 | 4/2011 | Tjader |
| 2011/0250020 A1 | 10/2011 | Carter et al. |
| 2016/0327199 A1 | 11/2016 | Tjader |
| 2019/0049055 A1 | 2/2019 | Tjader |
| 2022/0090723 A1 | 3/2022 | Tjader |

OTHER PUBLICATIONS

"U.S. Appl. No. 12/898,376, Final Office Action mailed Jun. 30, 2015", 9 pgs.
"U.S. Appl. No. 12/898,376, Final Office Action mailed Oct. 3, 2014", 9 pgs.
"U.S. Appl. No. 12/898,376, Non Final Office Action mailed Mar. 19, 2015", 9 pgs.
"U.S. Appl. No. 12/898,376, Non Final Office Action mailed Apr. 10, 2014", 8 pgs.
"U.S. Appl. No. 12/898,376, Non Final Office Action mailed Oct. 24, 2013", 10 pgs.
"U.S. Appl. No. 12/898,376, Notice of allowance mailed Jan. 7, 2016", 8 pgs.
"U.S. Appl. No. 12/898,376, Response filed Jan. 24, 2014 to Non Final Office Action mailed Oct. 24, 2013", 7 pgs.
"U.S. Appl. No. 12/898,376, Response filed Jun. 11, 2015 to Non Final Office Action mailed Mar. 19, 2015", 9 pgs.
"U.S. Appl. No. 12/898,376, Response filed Jul. 9, 2014 to Non Final Office Action mailed Apr. 10, 2014", 8 pgs.
"U.S. Appl. No. 12/898,376, Response filed Aug. 23, 2013 to Restriction Requirement mailed Jul. 24, 2013", 8 pgs.
"U.S. Appl. No. 12/898,376, Response filed Sep. 30, 2015 to Final Office Action mailed Jun. 30, 2015", 10 pgs.
"U.S. Appl. No. 12/898,376, Response filed Dec. 3, 2014 to Final Office Action mailed Oct. 3, 2014", 8 pgs.
"U.S. Appl. No. 12/898,376, Restriction Requirement mailed Jul. 24, 2013", 8 pgs.
"U.S. Appl. No. 15/149,793, Advisory Action mailed Jan. 26, 2018", 3 pgs.
"U.S. Appl. No. 15/149,793, Final Office Action mailed Oct. 27, 2017", 9 pgs.
"U.S. Appl. No. 15/149,793, Non Final Office Action mailed Mar. 9, 2018", 5 pgs.
"U.S. Appl. No. 15/149,793, Non Final Office Action mailed May 4, 2017", 12 pgs.
"U.S. Appl. No. 15/149,793, Notice of Allowance mailed Jul. 12, 2018", 5 pgs.
"U.S. Appl. No. 15/149,793, Preliminary Amendment filed Feb. 27, 2018", 5 pgs.
"U.S. Appl. No. 15/149,793, Preliminary Amendment filed Jul. 25, 2016", 6 pgs.
"U.S. Appl. No. 15/149,793, Response filed Dec. 27, 2017 to Final Office Action mailed Oct. 27, 2017", 8 pgs.
"U.S. Appl. No. 15/149,793, Response filed Jun. 11, 2018 to Non-Final Office Action mailed Mar. 9, 2018", 4 pgs.
"U.S. Appl. No. 15/149,793, Response filed Aug. 2, 2017 to NOn-Final Office Action mailed May 4, 2017", 7 pgs.
"U.S. Appl. No. 16/158,998, Advisory Action mailed Jan. 13, 2021", 2 pgs.
"U.S. Appl. No. 16/158,998, Advisory Action mailed Jan. 28, 2020", 3 pgs.
"U.S. Appl. No. 16/158,998, Final Office Action mailed Jun. 15, 2021", 6 pgs.
"U.S. Appl. No. 16/158,998, Final Office Action mailed Oct. 23, 2020", 11 pgs.
"U.S. Appl. No. 16/158,998, Final Office Action mailed Nov. 15, 2019", 9 pgs.
"U.S. Appl. No. 16/158,998, Non Final Office Action mailed Mar. 2, 2021", 11 pgs.
"U.S. Appl. No. 16/158,998, Non Final Office Action mailed Apr. 5, 2019", 8 pgs.
"U.S. Appl. No. 16/158,998, Non Final Office Action mailed Apr. 17, 2020", 13 pgs.
"U.S. Appl. No. 16/158,998, Notice of Allowance mailed Aug. 25, 2021", 5 pgs.
"U.S. Appl. No. 16/158,998, Response filed Jan. 15, 2020 to Final Office Action mailed Nov. 15, 2019", 6 pgs.
"U.S. Appl. No. 16/158,998, Response filed Jun. 2, 2021 to Non Final Office Action mailed Mar. 2, 2021", 7 pgs.
"U.S. Appl. No. 16/158,998, Response filed Jul. 17, 2020 to Non Final Office Action mailed Apr. 17, 2020", 7 pgs.
"U.S. Appl. No. 16/158,998, Response filed Aug. 16, 2021 to Final Office Action mailed Jun. 15, 2021", 6 pgs.
"U.S. Appl. No. 16/158,998, Response filed Dec. 23, 2020 to Final Office Action mailed Oct. 23, 2020", 7 pgs.
"U.S. Appl. No. 16/158,998, Response filed Aug. 5, 2019 to Non-Final Office Action mailed Apr. 5, 2019", 9 pgs.
"U.S. Appl. No. 17/540,806, Non Final Office Action mailed Sep. 7, 2022", 8 pgs.
"U.S. Appl. No. 17/540,806, Notice of Allowance mailed Oct. 13, 2022", 7 pgs.
"U.S. Appl. No. 17/540,806, Response filed Sep. 9, 2022 to Non Final Office Action mailed Sep. 7, 2022", 6 pgs.
"U.S. Appl. No. 17/540,806, Supplemental Notice of Allowability mailed Nov. 7, 2022", 2 pgs.
U.S. Appl. No. 12/898,376 U.S. Pat. No. 9,334,999, filed Oct. 5, 2010, Lubrication System for Pipe Bursting.
U.S. Appl. No. 15/149,793 U.S. Pat. No. 10,119,645, filed May 9, 2016, Lubrication System for Pipe Bursting.
U.S. Appl. No. 16/158,998 U.S. Pat. No. 11,209,111, filed Oct. 12, 2018, Lubrication System for Pipe Bursting.
U.S. Appl. No. 17/540,806 U.S. Pat. No. 11,578,830, filed Dec. 2, 2021, Lubrication System for Pipe Bursting.

* cited by examiner ized=long>
LUBRICATION SYSTEM FOR PIPE BURSTING

RELATED APPLICATIONS

This patent application is a continuation of and claims the benefit of priority to U.S. application Ser. No. 17/540,806, filed Dec. 2, 2021, which is a continuation of and claims the benefit of priority to U.S. application Ser. No. 16/158,998, filed Oct. 12, 2018, now U.S. Pat. No. 11,209,111, which is a continuation of and claims the benefit of priority to U.S. application Ser. No. 15/149,793 filed on May 9, 2016, now U.S. Pat. No. 10,119,645, which claims priority to U.S. application Ser. No. 12/898,376, filed Oct. 5, 2010, now U.S. Pat. No. 9,334,999, which claims the benefit of priority, under 35 U.S.C. § 119(e), to U.S. Provisional Patent Application Ser. No. 61/248,762, filed on Oct. 5, 2009, which are incorporated by reference herein in reference in its entirety.

TECHNICAL FIELD

Pipe bursting including small diameter pipe bursting.

BACKGROUND

Pipe, such as plastic, copper, lead pipe and the like, has been used for connecting homes and creating networks for utilities, for instance, water, sewage and natural gas. As pipes become older, they break down, crack, develop scaling on interior surfaces that can clog the pipe, and the like and thereby require replacement.

A technique known as pipe bursting is currently used as a convenient method to replace underground pipe without the need to completely excavate the pipe needing replacement. A pipe breaking device, such as an expander or a mole, is pulled by a cable through the existing pipe while it is still underground. The expander is designed to break, split or burst the pipe, and at the same time push the old pipe into the surrounding soil. The expansion of the old pipe allows the expander to pull a replacement pipe into place.

In one example, pipe splitters are used to burst piping and thereby must navigate tight bends in the pipe. An elongate pipe splitter experiences stress and friction as it attempts to navigate linear and non-linear lengths including tight bends and the splitter sometimes fractures within the pipe. This requires extraction and replacement of the pipe splitter to continue the operation. Replacement of the pipe splitter increases labor. Additionally, the pipe splitter is constructed with hardened steel in some examples, and is expensive. Replacing the pipe splitter thereby increases the cost of splitting pipes.

DESCRIPTION OF THE EMBODIMENTS

In the following detailed description, reference is made to the accompanying drawings which form a part hereof, and in which is shown by way of illustration specific embodiments in which the invention may be practiced. These embodiments are described in sufficient detail to enable those skilled in the art to practice the invention, and it is to be understood that other embodiments may be utilized and that structural changes may be made without departing from the scope of the present invention. Therefore, the following detailed description is not to be taken in a limiting sense, and the scope of the present invention is defined by the appended claims and their equivalents.

Figure 1A:
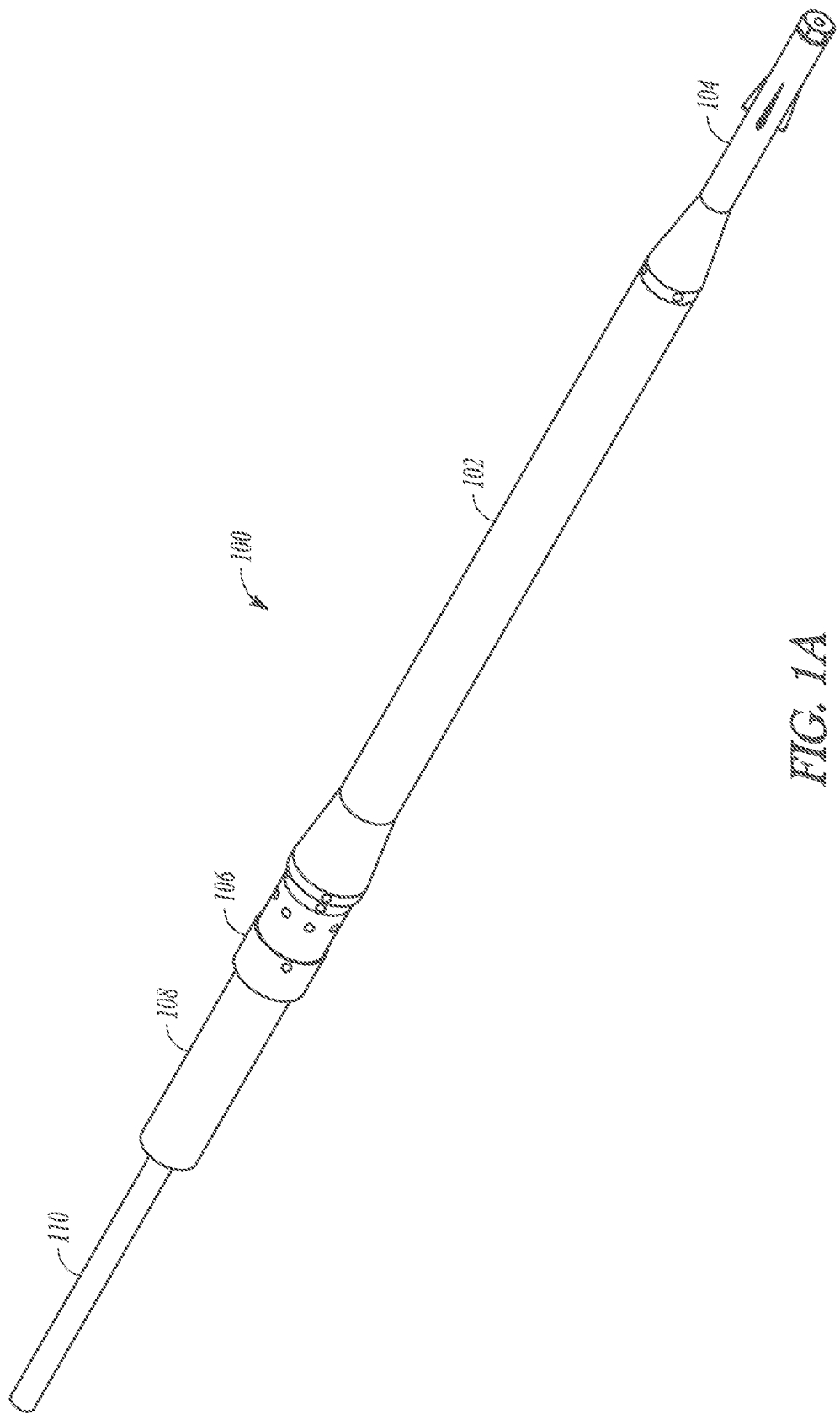
FIG. 1A is a perspective view showing one example of a pipe splitting assembly including a pneumatic hammer and hammer nose assembly.

FIG. 1A shows one example of a pipe splitting assembly 100 including a pneumatic hammer 102 and a hammer nose assembly 104. In one example, a pipe pulling assembly 106 is coupled with pneumatic hammer 102. For instance, the pipe pulling assembly 106 is pulled behind the pneumatic hammer 102 as the pipe splitting assembly 100 is pulled and driven to split an existing pipe. The pipe pulling assembly 106 positions a new replacement pipe within the space originally occupied by the existing pipe. An air line 110 is shown in FIG. 1A extending into the pipe pulling assembly 106. The air line 110 is coupled with the pneumatic hammer 102 and provides a source of compressed air to operate the hammer and drive the hammer nose assembly 104 and split the existing pipe.

Figure 1B:
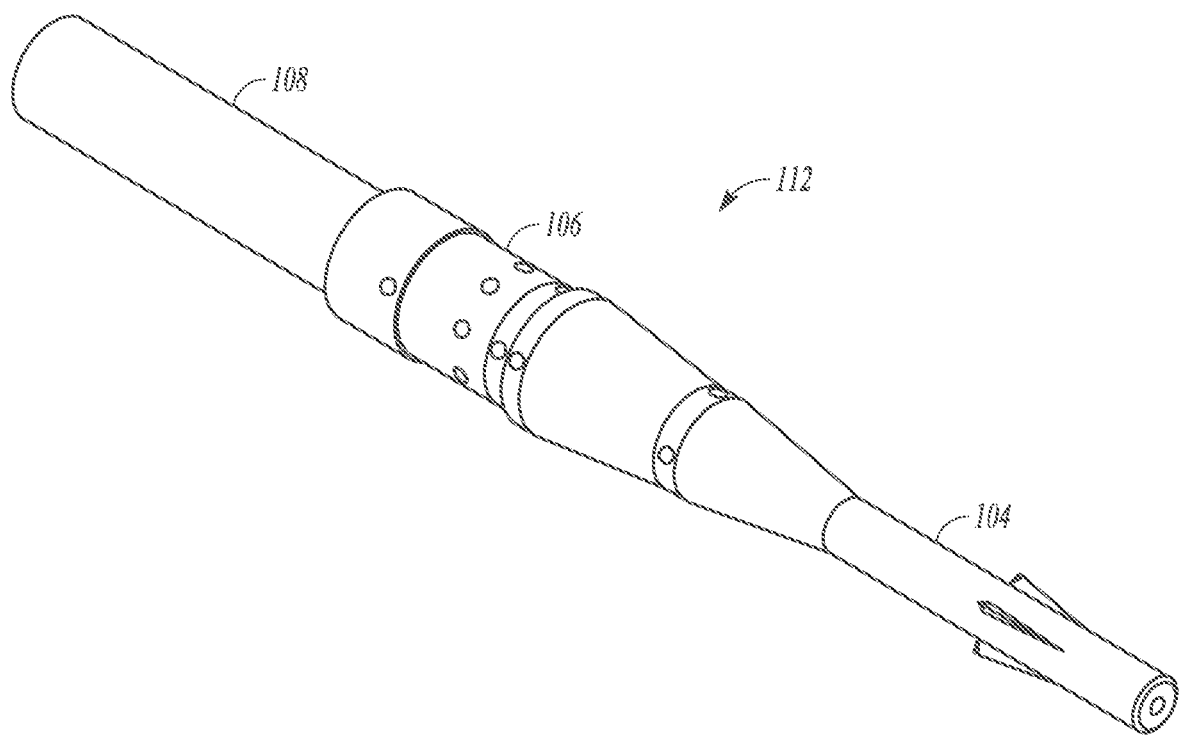
FIG. 1B is a perspective view showing another example of a pipe splitting assembly including rotatable joint.

Referring now to FIG. 1B, another example of a pipe splitting assembly 112 is shown. The pipe splitting assembly 112 differs from the pipe splitting assembly 100 in that the pipe splitting assembly 112 does not include a pneumatic hammer, such as the pneumatic hammer 102, shown in FIG. 1A. In other respects, the pipe splitting assembly 112 is similar to the pipe splitting assembly 100. For instance, the assembly 112 includes a pipe splitting assembly 104 and a pipe pulling assembly 106 sized and shaped for pulling a replacement pipe 108.

Figure 2A:
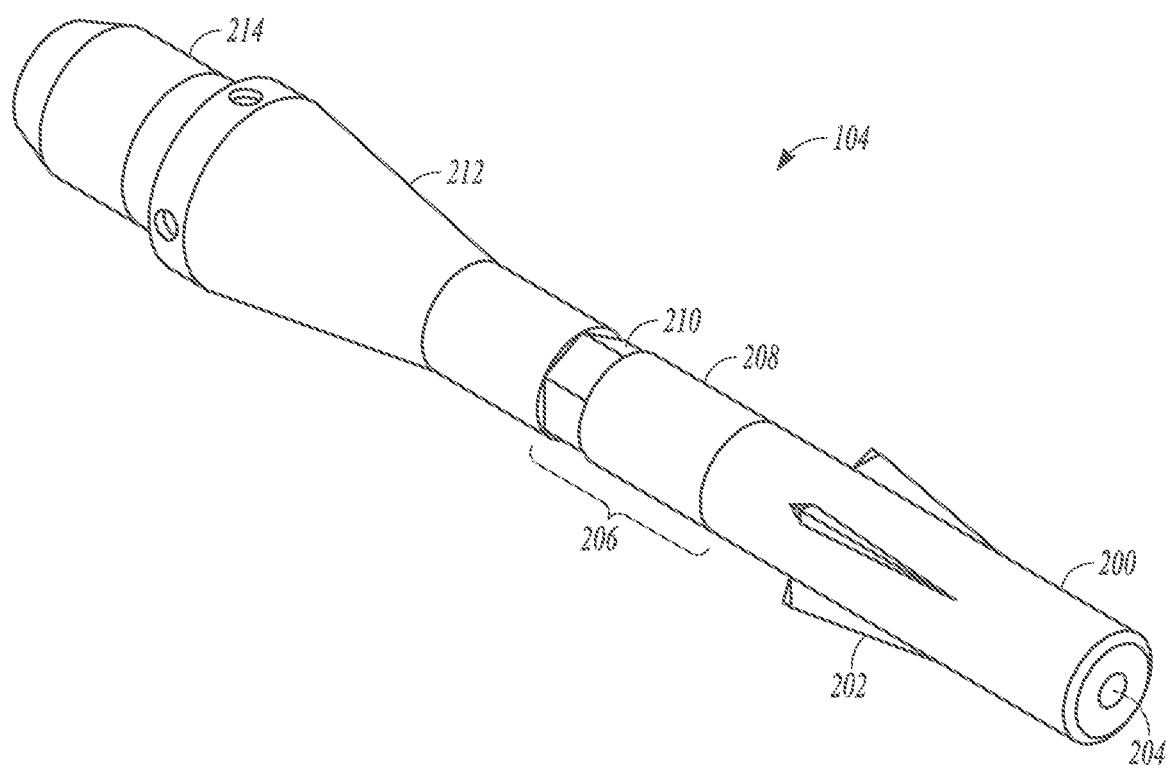
FIG. 2A is a perspective view showing one example of a pipe splitting assembly.

One example of a pipe splitting assembly 104 is shown in FIG. 2A. The pipe splitting assembly 104 includes a pipe splitting cutter 200 (e.g., cutter). The cutter includes cutter blades 202 sized and shaped to engage with an interior of an existing pipe and cut and break apart the existing pipe as the pipe splitting assembly 100 is pulled through. The cutter cable lumen 204 extends through the pipe splitting cutter 200 toward an expander 212. As will be described in further detail below, additional lumens within the pipe splitting assembly 104 align with the cutter cable lumen 204 and extend through the other components of assembly 104 to form a composite cable lumen.

As shown in FIG. 2A, the pipe splitting assembly 104 includes a rotatable joint 206. In one example, the rotatable joint includes an assembly of joints providing an articulated linkage between expander 212 including a cable coupling therein and the cutter 200. The rotatable joint 206 includes a joint bar 208 extending between the cutter 200 and the expander 212. In another example, a joint nut 216, a part of a cable coupling including the expander 212, is positioned adjacent to the joint bar 208 and forms a portion of the rotatable joint 206.

The pipe splitting assembly 104 further includes a coupling 214 sized and shaped to engage and connect with at least one of the pneumatic hammer 102 or a pipe pulling assembly (described below). In one example, the coupling 214 includes features to maintain a coupling between the pipe splitting assembly 104 and the pneumatic hammer 102 or pipe pulling assembly during operation of a pipe splitting assembly 100. Coupling features of the coupling 214 include, but are not limited to, threading, mechanical interfits, mechanical fasteners including pins, screws, bolts and the like.

Figure 2B:
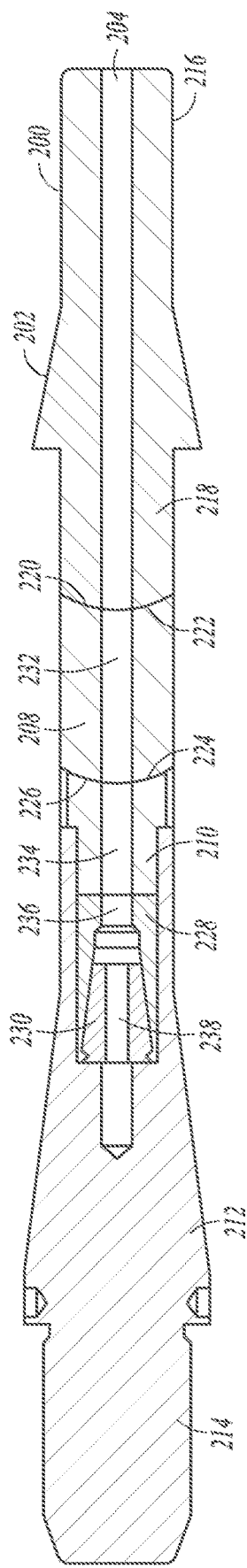
FIG. 2B is a cross-sectional view of the pipe splitting assembly shown in FIG. 2A.

Referring now to FIG. 2B, the pipe splitting assembly 104 is shown in cross section. As previously described, the pipe splitting assembly 104 includes a series of lumens aligned to provide an overall cable lumen extending through the pipe splitting assembly from the cutter 200 to the expander 212 (e.g., the cable coupling). For instance, the cutter includes the cutter cable lumen 204, the joint bar includes the joint cable lumen 232, the joint nut 210 includes a nut cable lumen 234, the expander 212 having the cable coupling therein includes a housing cable lumen 236 and an anchor cable lumen 238. The composite cable lumen formed by these lumens allows the passage of a cable extending form a winch through the existing pipe through a cutter proximal end 216 to the expander 212 to facilitate connection of each of these components along the cable and transmission of pulling forces through the cable to the expander and into the connective rotatable joint 206 and cutter 200.

The cutter 200 includes a cutter proximal end 216 and a cutter distal end 218. The cutter distal end 218, in one example, includes a cutter fitting 220 sized and shaped for reception within a joint bar socket 222 of the joint bar 208.

In a similar manner to the cutter 200 the joint bar 208 includes a joint bar fitting 224 sized and shaped for reception within a joint nut socket 226. As will be described in further detail below, the rotatable joint 206 including the joint bar 208, fittings 220, 224 and sockets 222, 226 enables the pipe splitting assembly 104 to articulate relative to the pneumatic hammer 102 or pipe pulling assembly. For example, the cutter 200 is capable of rotating relative to the expander 212 and the pneumatic hammer 102 coupled with the expander. The fittings 220, 224 and sockets 222, 226 form ball and socket joints and allow rotation of the cutter 200 relative to the pneumatic hammer 102 while enabling the pneumatic hammer 102 to continue providing dynamic percussive forces to the pipe splitting assembly 104 including the cutter 200. Stated another way, the pipe splitting assembly 104 including the rotatable joint 206 provides an articulating guide that navigates the pneumatic hammer 102 or pipe pulling assembly through an existing non-linear pipe while also providing a cutter 200 capable of splitting the non-linear portions of the existing pipe where the pipe splitting assembly 104 is not otherwise aligned with the pneumatic hammer 102.

Additionally, the rotatable joint 206 allows articulation of the cutter 200 relative to the expander 212 including the cable coupling therewithin. Pulling forces transmitted from a winch through the cable extending into the pipe splitting assembly 104 are transmitted to the expander 212. The pulling forces transmitted to the expander 212 are further transmitted in compression through the rotatable joint 206. The rotatable joint 206 transmits the pulling forces from the expander 212 into the cutter 200 where the cutter 200 is at any angle relative to the expander 212 while the cutter 200 remains engaged with the rotatable joint interposed between the cutter and the expander 212. Put another way, the surfaces of the rotatable joint 206 (e.g., the cutter fitting 220, joint bar fitting 224, socket 222 and joint nut socket 226) are continuously engaged during articulation of the pipe splitting assembly 104. Engagement between these sockets and fittings transmits compressive forces to the cutter 200 from pulling of the expander 212 through the pipe splitting assembly where the cutter 200 is in substantially any orientation relative to the expander 212 while coupled through the rotatable joint 206.

Referring again to FIG. 2B, the expander 212 is shown in this example with a cable gripping housing 228 coupled around a cable gripping anchor 230. As described in further detail below, the cable gripping anchor 230 extends around a cable extending through the housing cable lumen 236 within the expander 212. Pulling of the cable moves the cable gripping anchor proximally into engagement with the tapered surfaces of the cable gripping housing 228. Engagement of the cable gripping anchor with the cable gripping housing 228 compresses the cable gripping anchor around the cable and forms a tight interfit to anchor the cable within the pipe splitting assembly 104. Additional pulling forces from the cable are transmitted into the cable gripping housing 228 and the expander 212 from the cable gripping anchor 230. Pulling forces are thereafter transmitted through the rotatable joint 206 into the cutter 200. Stated another way, the cable gripping anchor 230 and cable gripping housing 228 cooperate to clamp around a cable extending into the anchor cable lumen 238 and housing cable lumen 236.

Figure 3A:
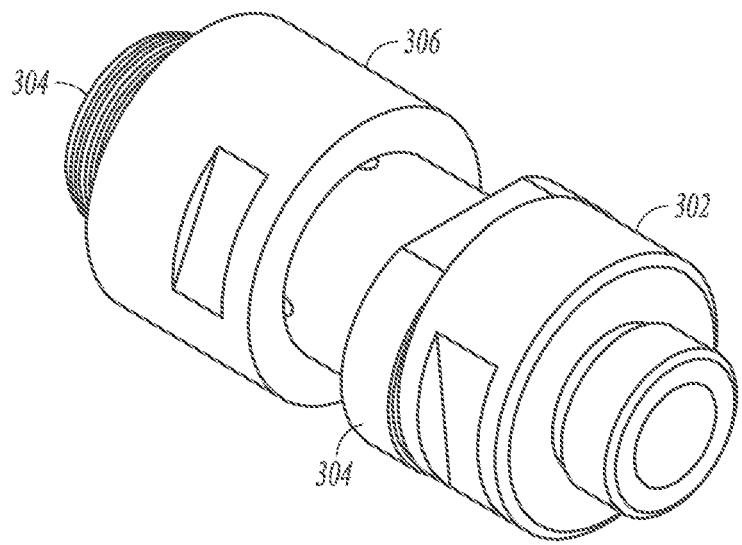
FIG. 3A is a perspective view of one example of a pipe pulling assembly.
Figure 3B:
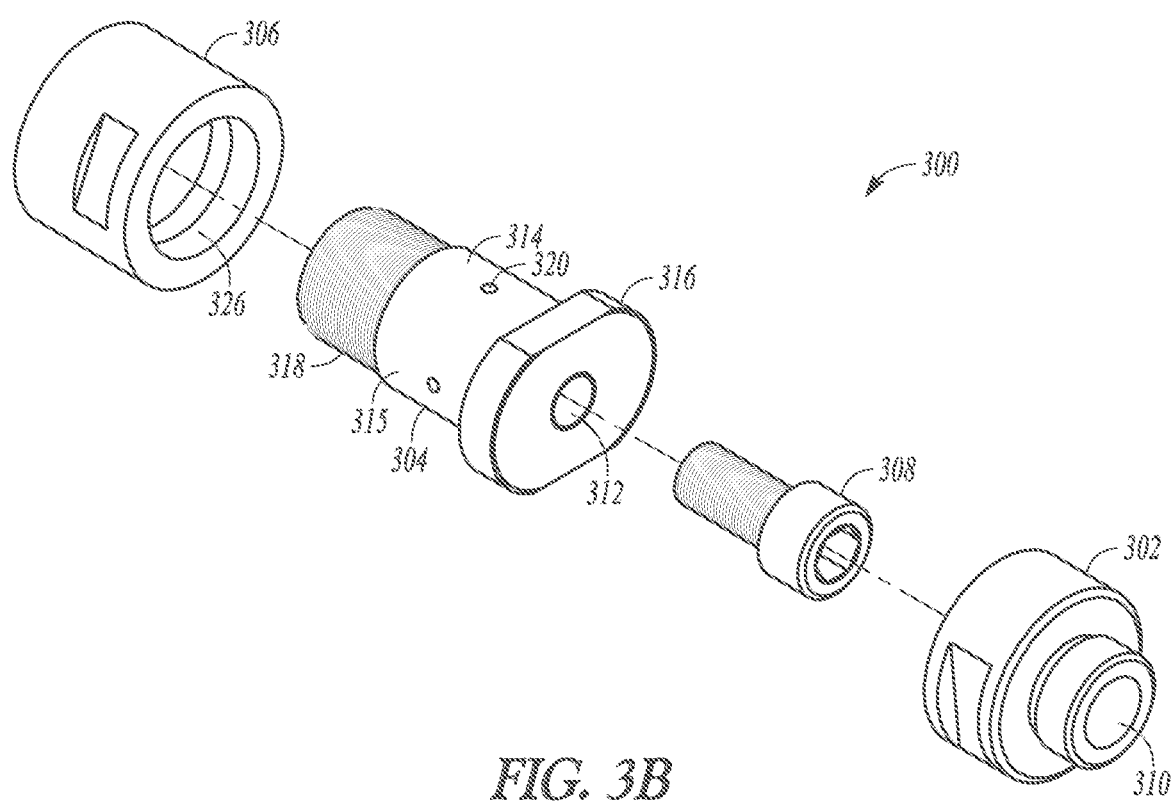
FIG. 3B is a an exploded perspective view of the pipe pulling assembly shown in FIG. 3A.
Figure 3C:
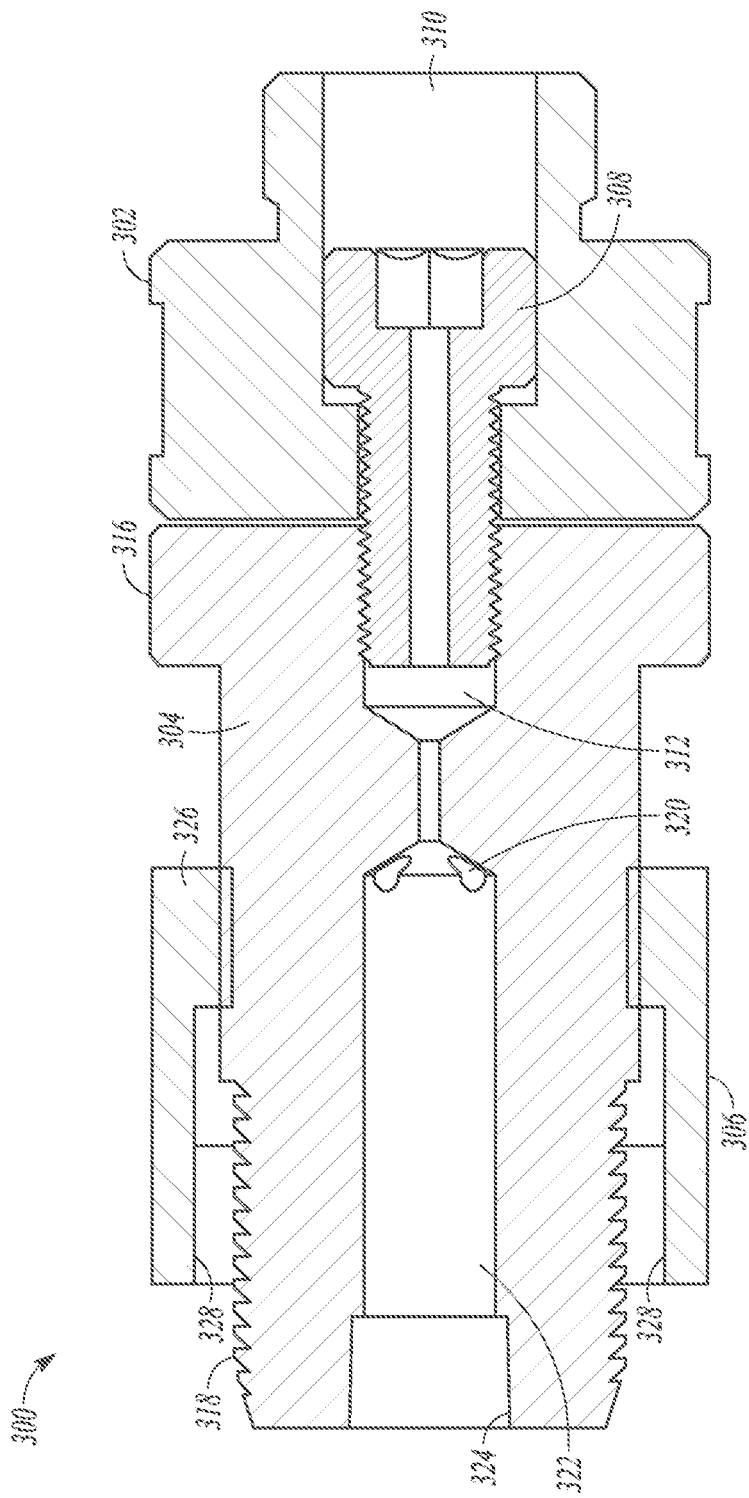
FIG. 3C is a cross-sectional view of the pipe pulling assembly shown in FIG. 3A.

Another example of a pipe pulling assembly 300 is shown in FIGS. 3A-C. As shown in FIG. 3A, the pipe pulling assembly 300 includes an expander coupling 302 coupled with a pipe anchor 304. In one example, the expander coupling 302 is rotatable relative to the pipe anchor 304 to facilitate easy coupling between the expander coupling 302 and an expander of a pipe splitting assembly or pneumatic hammer and coupling of the pipe anchor 304 with the pipe and lubricant line used for lubricating a replacement pipe, such as replacement pipe 108 shown in FIGS. 1A-B. The pipe pulling assembly 300 further includes a pipe sleeve 306 sized and shaped to rotate around the pipe anchor 304. As described in further detail below, the pipe sleeve 306 couples around a replacement pipe positioned along the pipe anchor 304 and clamps the replacement pipe over the pipe anchor 304.

Referring now to FIG. 3B, the pipe pulling assembly 300 is shown in an exploded view. The expander coupling 302 is spaced from the pipe anchor 304 with an anchor bolt 308 disposed therebetween. The anchor bolt 308 couples the expander coupling 302 with the pipe anchor 304 and permits relative rotational movement between the pipe anchor and expander coupling. As shown in FIG. 3B, the expander coupling 302 includes an expander coupling lumen 310 sized and shaped to receive the head of the anchor bolt 308 for coupling of the expander coupling 302 to the pipe anchor 304. The pipe anchor 304 includes an anchor lumen 312 sized and shaped for reception and engagement of the anchor bolt 308. For instance, the anchor lumen 312 includes threading corresponding to threading along the anchor bolt 308.

The pipe anchor 304 as shown in FIG. 3B extending between an anchor proximal portion 316 and an anchor distal portion 318 with an anchor intermediate portion 317 therebetween. The pipe anchor 304 includes an anchor exterior surface 314 extending between the proximal and distal portions 314,316. Lubricant passages 320 are shown positioned around the anchor exterior surface 314 and form a lubricant distributor as a portion of a lubricating system. As will be described in further detail below, the lubricant passages 320 are configured to distribute a lubricating fluid to the exterior of the pipe anchor 304 and an exterior surface of the replacement pipe 108. The lubricant decreases the skin friction of the replacement pipe and decreases the force needed to pull the replacement pipe 108 through existing piping and surrounding soil and rock. In one example, the lubricating fluid includes a solution of water and polymer that provides enhanced lubricity to the solution. In one option, the lubricating fluid includes a liquid polymer emulsion containing partially hydrolyzed polyacrylamid/polyacrylate (PHPA) copolymer sold under the trademarked name EZ-MUD assigned to Baroid Industrial Drilling Products. In another example, the lubricating fluid includes a solution of water and clay, such as Bentonite.

The pipe sleeve 306 is spaced from the pipe anchor 304 to show a sleeve flange 326. In one example, the sleeve flange 326 includes threading sized and shaped to engage and couple the pipe sleeve 306 with corresponding threading extending along the anchor exterior surface 314. In one example, the threading extending along the anchor exterior surface 314 extends from the anchor proximal portion 316 toward the anchor distal portion 318 (the threading shown near the anchor distal portion 318 is sized and shaped for engagement with the replacement pipe 108 and therefore has a smaller diameter). The threading extending along the anchor exterior surface 314 from near the anchor proximal portion 316 allows the pipe sleeve 306 to rotatably couple with the pipe anchor 304. After the replacement pipe 108 (see FIGS. 1A, B) is threaded on to the threaded surface near the anchor distal portion 318, the pipe sleeve 306 is tightened distally by rotating the sleeve relative to the pipe anchor 304. As shown in FIG. 3C, the pipe sleeve 306 includes a sleeve tapered surface 328 having a slight outward taper from the anchor proximal portion 316 toward the anchor distal portion 318. The sleeve tapered surface 328 engages around the replacement pipe 108 and clamps the replacement pipe 108 on the anchor distal portion 318 thereby ensuring a tight fixed coupling between the pipe pulling assembly 300 and the replacement pipe 108.

Referring again to FIG. 3C, the interior of the pipe anchor 304, including a lubricant conduit 322 is shown. The lubricant conduit 322 is sized and shaped to transmit a lubricating fluid from the anchor distal portion 318 toward the anchor proximal portion 316 for delivery through the lubricant passages 320. The lubricant conduit 322 cooperates with the lubricant passages 320 to form a lubricant system. In one example, the pipe anchor 304 includes a lubricant line connector 324. The lubricant line connector 324 optionally includes a coupling feature sized and shaped to receive a quick connect coupling. The quick connect coupling is fixed along the lubricant line connector 324 and is able to rotate therein while remaining fixed to the pipe anchor 304. A fluid line capable of passing a lubricating fluid is connected to the lubricant line connector 324 to transmit fluid into the pipe anchor 304 for distribution through the lubricant passages 320. The rotatable coupling between the lubricating fluid line and the pipe anchor 304 permits rotation of the pipe anchor 304, for instance, for coupling with a replacement pipe, such as replacement pipe 108, without disengaging the lubricating line from the pipe anchor 304.

The anchor bolt 308 is shown in FIG. 3C coupled between the expander coupling 302 and the pipe anchor 304. As previously described, the anchor bolt 308 rotatably couples the expander coupling 302 with the pipe anchor 304 and permits rotation of the pipe anchor 304 for coupling with a replacement pipe, such as replacement pipe 108 shown in FIGS. 1A, B. In a similar manner, the expander coupling 302 is rotatable relative to the pipe anchor 304 to permit rotation of the expander coupling 302 for engagement with an expander, for instance, an expander of a pipe splitting assembly, such as the pipe splitting assembly 104 shown in FIG. 1B. As will be described in further detail below, the anchor bolt 308 in another example, provides a bridging lubricant conduit between the pipe anchor 304 and the expander coupling 302. The bridging lubricant conduit passes lubricating fluid into the expander for application of the lubricating fluid to the exterior of the expander and further reductions of skin friction of the pipe pulling assembly 300. The enhanced reduction of skin friction facilitates easier pulling of the pipe pulling assembly 300 and the replacement pipe 108.

Figure 4A:
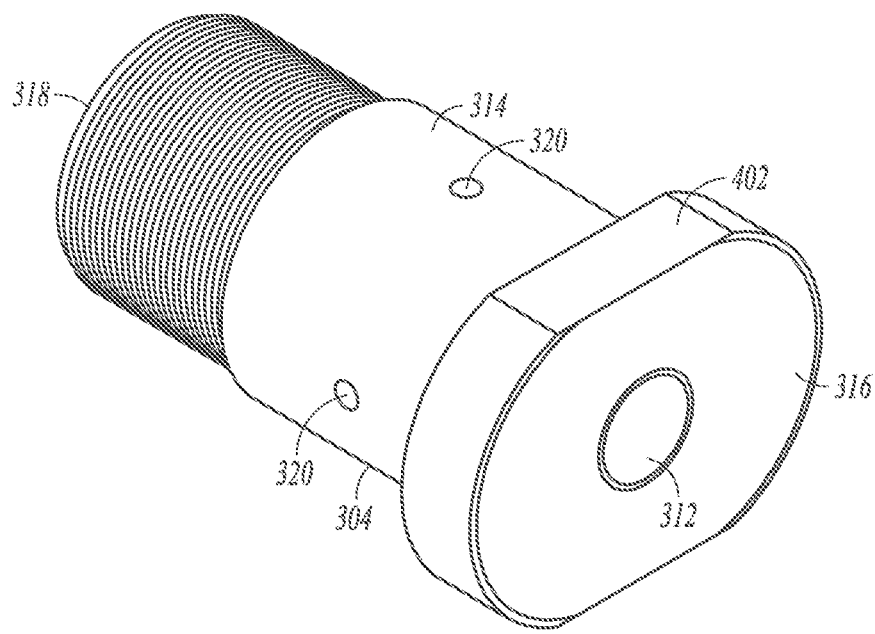
FIG. 4A is a perspective view of the front of one example of a pipe anchor.
Figure 4B:
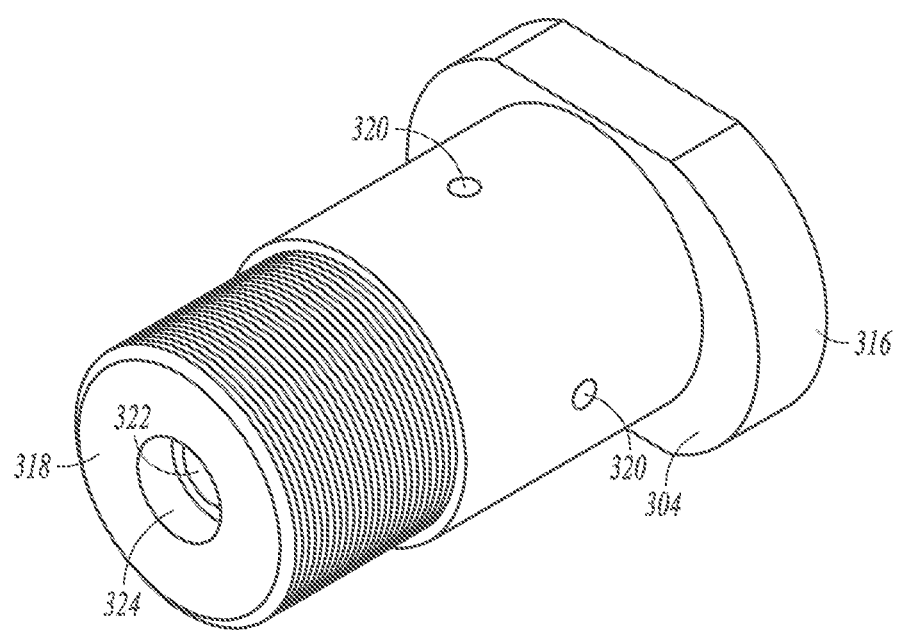
FIG. 4B is a perspective view of the rear of the pipe anchor shown in FIG. 4A.
Figure 4C:
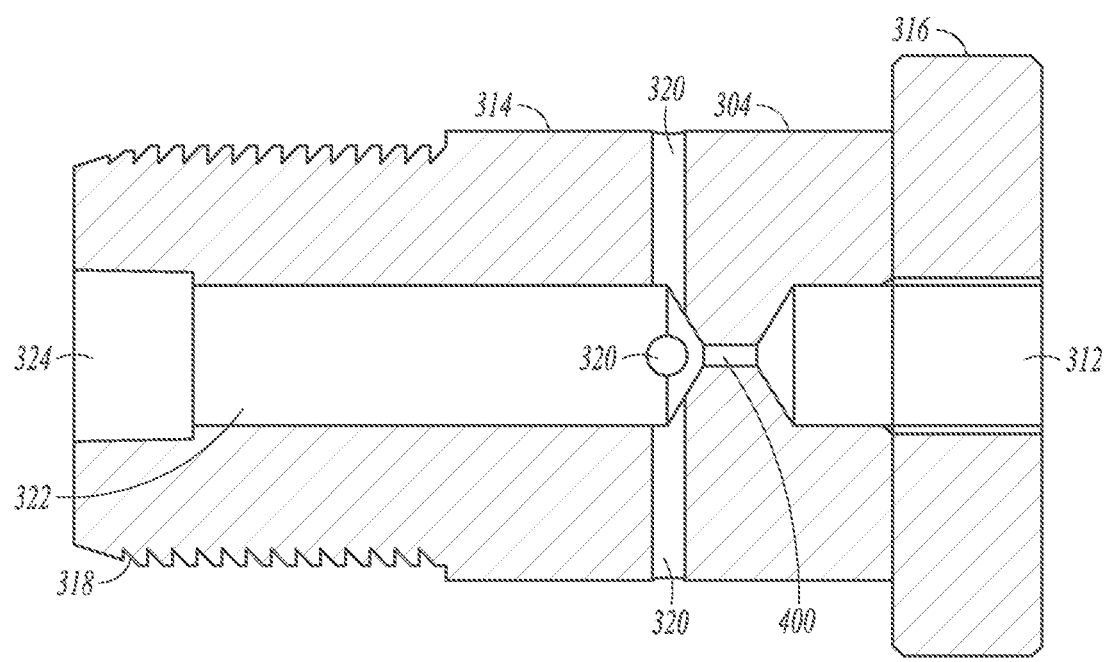
FIG. 4C is a cross-sectional view of the pipe anchor shown in FIG. 4A.

FIGS. 4A-C show detailed views of the pipe anchor 304. As previously discussed, the pipe anchor 304 extends between an anchor proximal portion 316 and an anchor distal portion 318. In one example, the pipe anchor 304 includes threading extending along the anchor exterior surface 314 from near the anchor distal portion 318 toward the anchor proximal portion 316. The threading near the anchor distal portion 318 is sized and shaped to couple with an interior surface of a replacement pipe 108 (see FIGS. 1A, B). For instance, the threading near the anchor distal portion 318 is configured to tap the interior of the replacement pipe 108 and thereby fix the replacement pipe 108 along the pipe anchor 304. In still another example, the pipe anchor 304 includes a second threaded surface (with a diameter larger than the threading for tapping and fixing of the replacement pipe 108) extending from near the anchor proximal portion 316 toward the anchor distal portion 318. The threading is sized and shaped to engage with corresponding threading extending along the sleeve flange 326 of the pipe sleeve 306 (See FIGS. 3B, C). As previously discussed, the pipe sleeve 306 is rotated relative to the pipe anchor 304 to move the pipe sleeve 306 over the replacement pipe 108 coupled along the anchor distal portion 318. Movement of the pipe sleeve 306 over the replacement pipe 108 clamps the replacement pipe along the anchor distal portion 318. In one option, the pipe anchor 304 is rotated relative to the pipe sleeve 306 and the expander coupling 302 shown in FIGS. 3A-C through engagement of a tool along tool surfaces 402 extending around the pipe anchor 304. The tool surfaces 402 are sized and shaped to receive a tool, such as a wrench, to provide torque to the pipe anchor 304 for rotation relative to the pipe sleeve 306 and expander coupling 302 to adjust one or more of the pipe sleeve, expander coupling or pipe anchor.

Also shown in FIGS. 4A, 4B are the lubricant passages 320 spaced around the anchor exterior surface 324. In one example, the pipe anchor 304 includes one lubricant passage 320. In another example, the pipe anchor 304 includes two or more lubricant passages 320 spaced around the anchor exterior surface 314 at a desired interval (e.g., every 90 degrees). In still other examples, additional lubricant passages 320 are spaced around the anchor exterior surface 314 providing an array of lubricant passages 320 around the anchor exterior surface 314 to enhance the application of lubricant to the replacement pipe 108 as the replacement pipe is drawn through an existing pipe and surrounding soil and rock.

As shown in FIG. 4C, the lubricant passages 320 are in communication with the lubricant conduit 322 extending from the anchor distal portion 318 longitudinally toward the anchor proximal portion 316. As previously described, lubricating fluid provided through the lubricant conduit 322 is distributed through the lubricant passages 320 to the anchor exterior surface 314. Optionally, the lubricating fluid is provided under high pressure through the lubricant conduit 322 and projects from the lubricant passages 320 dispersed around the anchor exterior surface 314 in jets that spray the existing pipe, surrounding soil and rock as well as the replacement pipe 108 with a lubricating fluid to decrease the friction between the replacement pipe and the surrounding materials and facilitating pulling of the replacement pipe.

In one example, the pipe anchor 304 including the lubricant passages 320 and lubricant conduit 322 is formed by machining of a material such as hardened steel. Lubricant passages 320 and lubricant conduit 322 are formed within the pipe anchor 304 by machining. In another example, the pipe anchor 304 is formed with another method including molding out of a high strength composite material. The lubricant passages 320 and lubricant conduit 322 are thereafter drilled into the composite resin of the pipe anchor 304. In still another example, the lubricant passages 320 and the lubricant conduit 322 are molded within the pipe anchor 304 as the pipe anchor is formed.

Referring again to FIG. 4C, in one example the pipe anchor 304 includes a second lubricant conduit 400 in communication with the lubricant conduit 322. The second lubricant conduit 400 extends from the lubricant conduit 322 into the anchor lumen 312 sized and shaped for reception of the anchor bolt 308. As will be described in further detail below, the second lubricant conduit 400 transmits lubricating fluid from the lubricant conduit 322 into the anchor lumen 312 where it is then delivered through a lumen of the anchor bolt 308 into an expander such as an expander of the hammer nose assembly or pipe splitting assembly 104 shown in FIGS. 1A, B. Lubricating fluid is spread over the exterior surface of the expander and substantially decreases the skin friction of the expander to decrease the force needed to pull the pipe pulling assembly 300 and pipe splitting assemblies 100, 112 through existing piping, soil and rock.

Figure 5A:
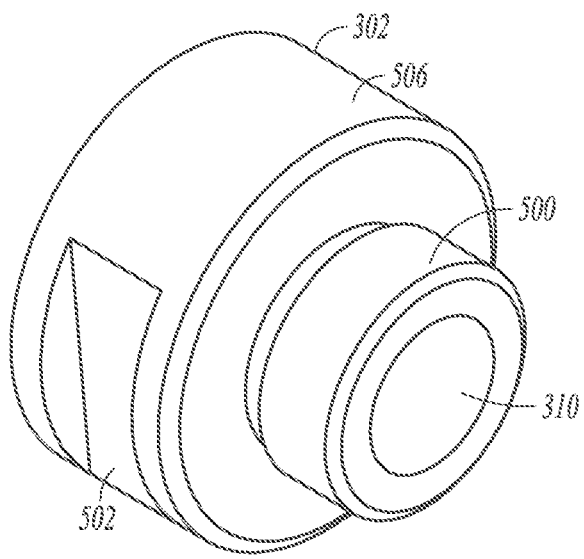
FIG. 5A is a perspective view of one example of an expander coupling.

The expander coupling 302 is shown in detail in FIGS. 5A, B. The expander coupling 302 includes a coupling base 506 and a coupling projection 500 extending from the coupling base. As shown in both FIGS. 5A, B the coupling projection 500 has a smaller perimeter than the coupling base 506. The projection 500 is sized and shaped for reception within an expander such as an expander used with the pipe splitting assembly or hammer nose assembly 104 shown in FIGS. IA, B. In one example, the coupling projection 500 includes a threaded surface sized and shaped to engage with a corresponding thread surface within the expander of the hammer nose assembly or pipe splitting assembly 104. Rotation of the expander coupling 302 couples the coupling projection 500 within the expander and longitudinally retains the expander coupling 302 with the hammer nose assembly or pipe splitting assembly. In another example, the coupling projection 500 includes a quick connect surface sized and shaped to engage with the corresponding quick connect surface of the expander. In still another example, the coupling projection 500 includes but is not limited to one or more of a series of mechanical features sized and shaped to engage with corresponding mechanical features of the expander. In one example, the expander coupling 302 is rotated relative to the pipe anchor 304 through tool surfaces 502 provided on the perimeter of the coupling base 506. The tool surfaces 502 are sized and shaped to receive corresponding surfaces of a tool, such as a wrench, to rotate the expander coupling 302.

Figure 5B:
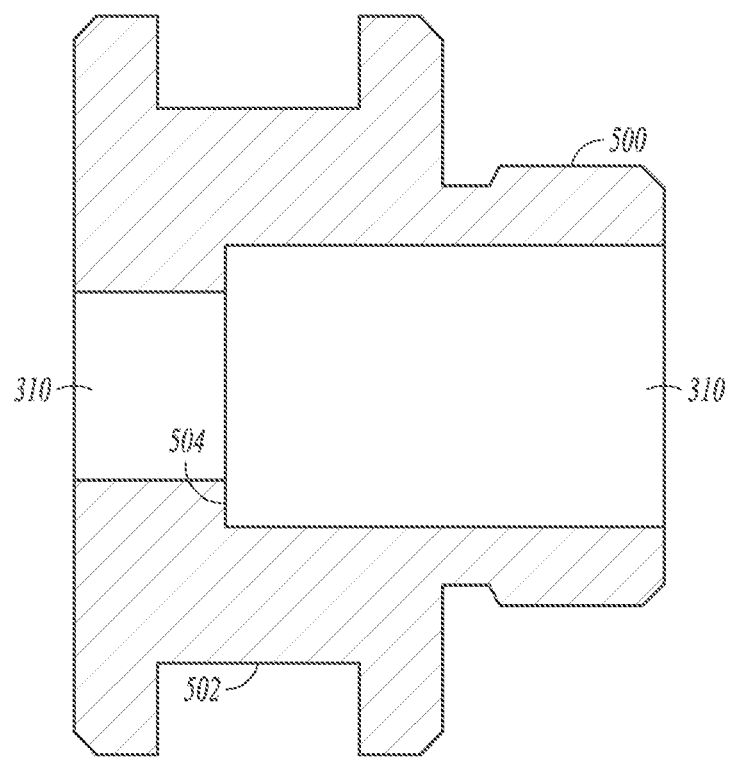
FIG. 5B is a cross-sectional view of the expander coupling shown in FIG. 5A.

Referring now to FIG. 5B, one example of a bolt seat 504 is shown. The bolt seat 504 is sized and shaped to receive the head of the anchor bolt 308 shown in FIGS. 3B, C. To couple the expander coupling 302 with the pipe anchor 304, the bolt 308 is fed through the expander coupling lumen 310 and into the anchor lumen 312. As previously described, the surfaces surrounding the anchor lumen 312 are correspondingly threaded to the bolt 308. Rotation of the bolt 308 couples the expander coupling 302 to the pipe anchor 304. In a similar manner to other components of the pipe pulling assembly 300, the expander coupling 302 is constructed with but not limited to metals, resins and the like having sufficient structural integrity to withstand the pulling forces needed to split an existing pipe and pull a replacement pipe, such as replacement pipe 108, into position within surrounding soil and rock.

Figure 6A:
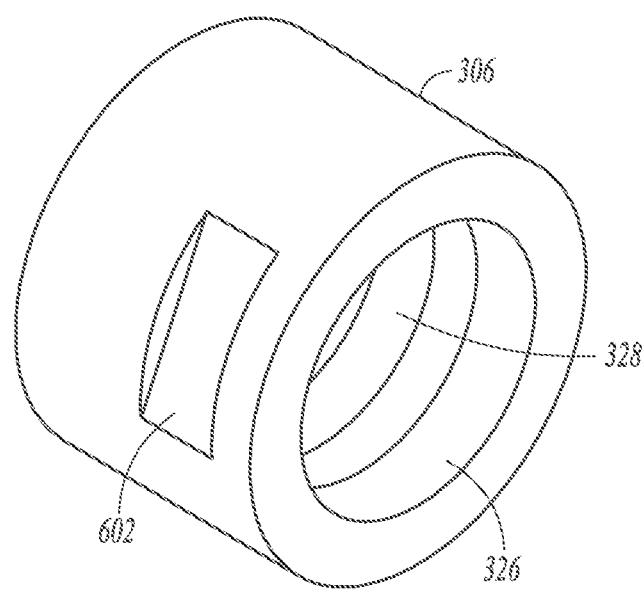
FIG. 6A is a perspective view of one example of a pipe sleeve.
Figure 6B:
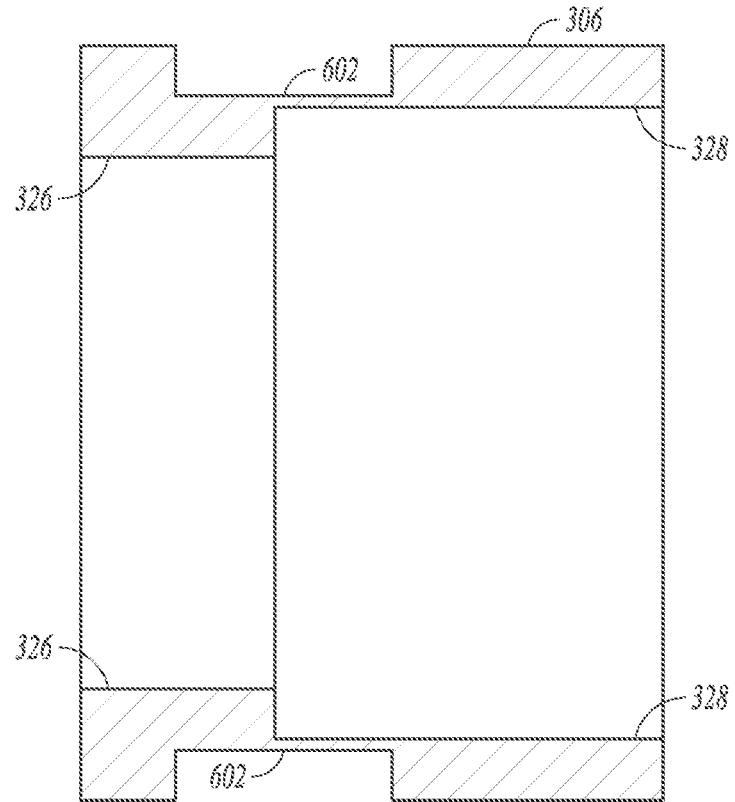
FIG. 6B is a cross-sectional view of the pipe sleeve shown in FIG. 6A.

A detailed view of the pipe sleeve 306 is shown in FIG. 6A, B. As previously described, the pipe sleeve 306 includes a sleeve flange 326 sized and shaped to engage with a corresponding mechanical fitting surface extending along the anchor proximal portion 316 shown in FIG. 3B. In one example, the sleeve flange 326 includes threading corresponding to threading extending along the anchor proximal portion 316. Tool surfaces 602 are provided along the perimeter of the pipe sleeve 306 and are used to rotate the pipe sleeve 306 relative to the pipe anchor 304 and correspondingly move the pipe sleeve 306 over a replacement pipe 108 coupled around the anchor distal portion 318. As previously described above, the sleeve tapered surface 328 engages against the replacement pipe 108 and clamps the replacement pipe along the anchor distal portion 318.

Figure 7A:
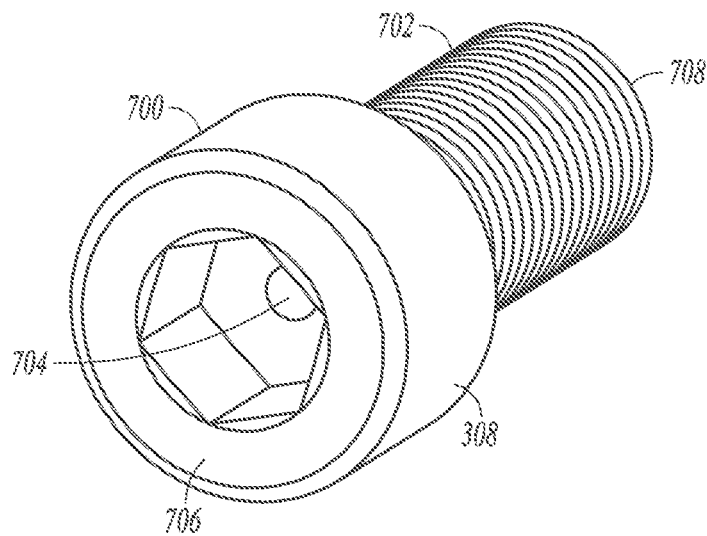
FIG. 7A is a perspective view of one example of an anchor bolt.
Figure 7B:
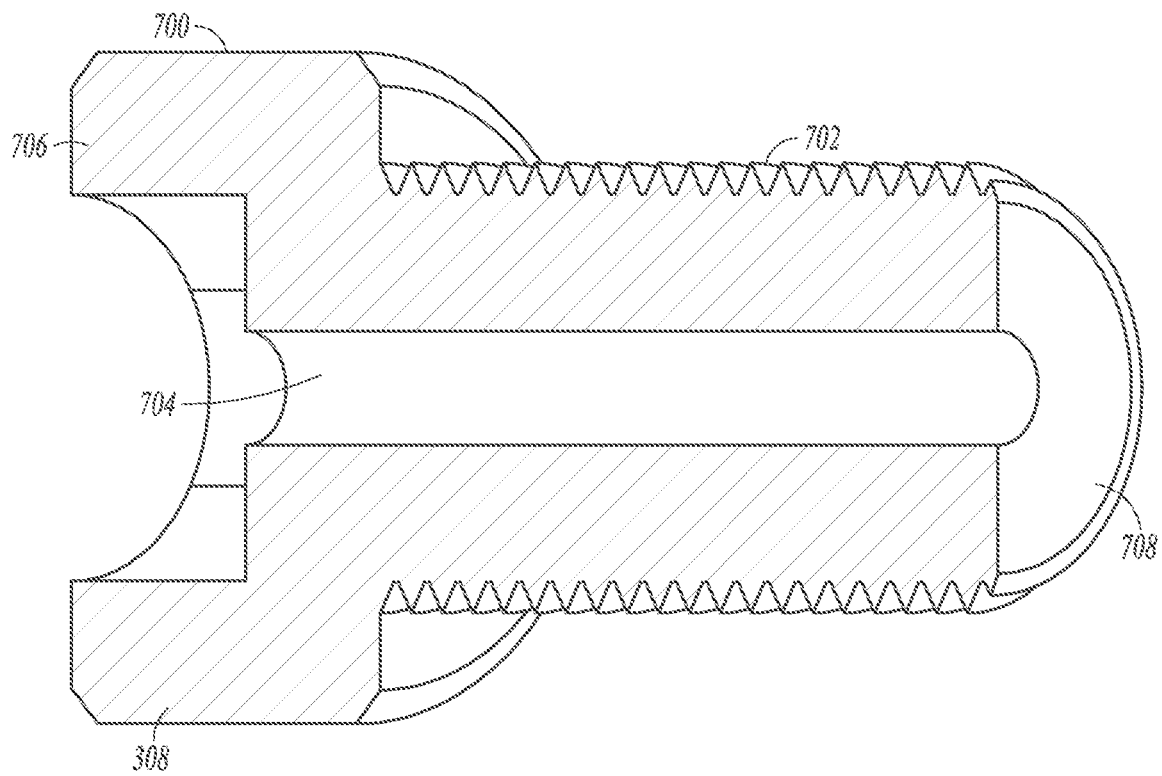
FIG. 7B is a perspective cross-sectional view of the anchor bolt shown in FIG. 7A.

The anchor bolt 308 shown in FIGS. 3B, C is shown in detail in FIGS. 7A, B. The anchor bolt 308 includes a bolt head 700 and bolt shaft 702 extending from the bolt head. As previously described, the bolt shaft 702 includes threading corresponding to threading within the anchor lumen 312 of the pipe anchor 304 (see FIG. 3C). The anchor bolt 308 is coupled between the expander coupling 302 and the pipe anchor 304 to connect the pipe pulling assembly 300 with the pipe splitting assembly 100 (e.g., to a pneumatic hammer 102 or a pipe splitting assembly 104 as shown in FIGS. 1A, B).

In another example, the anchor bolt 308 includes a bolt lubricant conduit 704 extending from a bolt proximal portion 706 adjacent to the bolt head 700 to the bolt distal portion 708. The bolt lubricant conduit 704 cooperates with the second lubricant conduit 400 of the pipe anchor 304 and the anchor lumen 312 to transmit lubricating fluid into the expander coupled with the expander coupling 302. As described in further detail below, the lubricating fluid transmitted into the expander is distributed over the expander surface and reduces the skin friction of the expander thereby minimizing the forces needed to pull the pipe splitting assembly 100 including the pipe pulling assembly 300 through the surrounding soil, rock and first existing pipe. The threading along the bolt shaft 702 tightly engages with corresponding threading within the anchor lumen 312 of the pipe anchor 304 to substantially prevent the passage of lubricating fluid around the perimeter of the bolt shaft 702 and out of the pipe anchor 304 (for instance, between the expander coupling 302 and the pipe anchor 304). Instead, the anchor bolt 308 provides a bridging lubricant conduit that passes the lubricating fluid from the pipe anchor 304 toward an expander of one or more of the pneumatic hammer 102 or pipe splitting assembly 104 (See FIGS. 1A, B). Optionally, where lubrication of the expander is not desired, the anchor bolt 308 including the bolt lubricant conduit 704 is exchanged for a solid bolt. The solid bolt seals the juncture between the pipe anchor 304 and the expander coupling 302 to prevent passage of lubricating fluid to the expander coupling 302 and the expander.

Figure 8A:
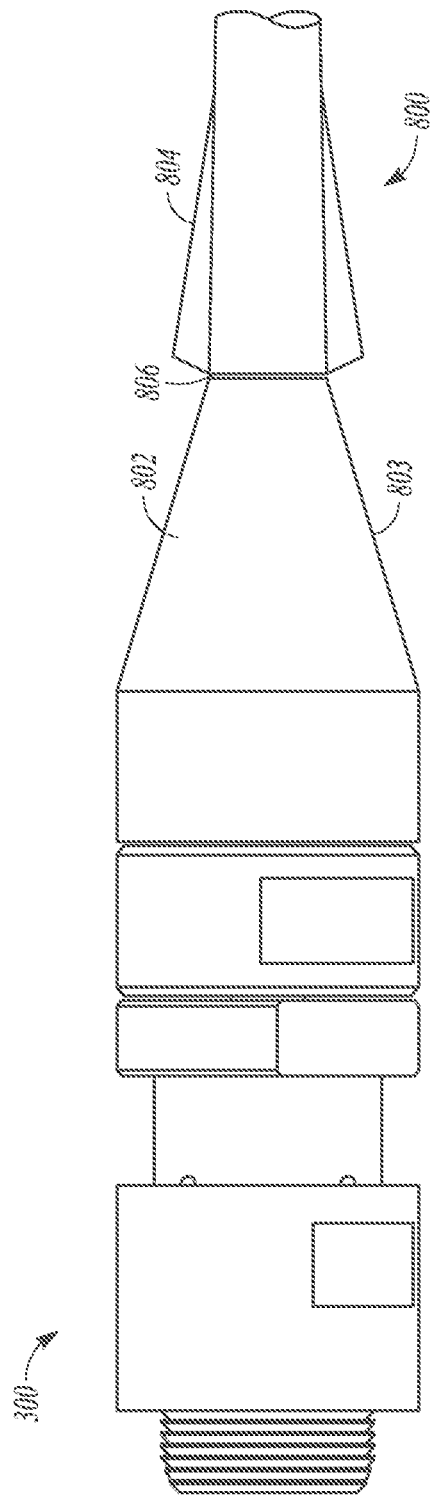
FIG. 8A is a perspective view of the pipe pulling assembly shown in FIG. 3A coupled with one example of a pipe splitting assembly.

One example of the pipe pulling assembly 300 is shown in FIGS. 8A, B coupled with a pipe splitting assembly 800. The pipe splitting assembly includes an expander 802 having an expander tapered surface 803 that tapers toward a cutter 804 rotatably coupled with the expander 802. A lubricant gap 806 is between the cutter 804 and the expander 802. One example of the lubricant gap 806 corresponds to a rotatable joint 206, such as the rotatable joint shown in FIGS. 2A, 2b.

Figure 8B:
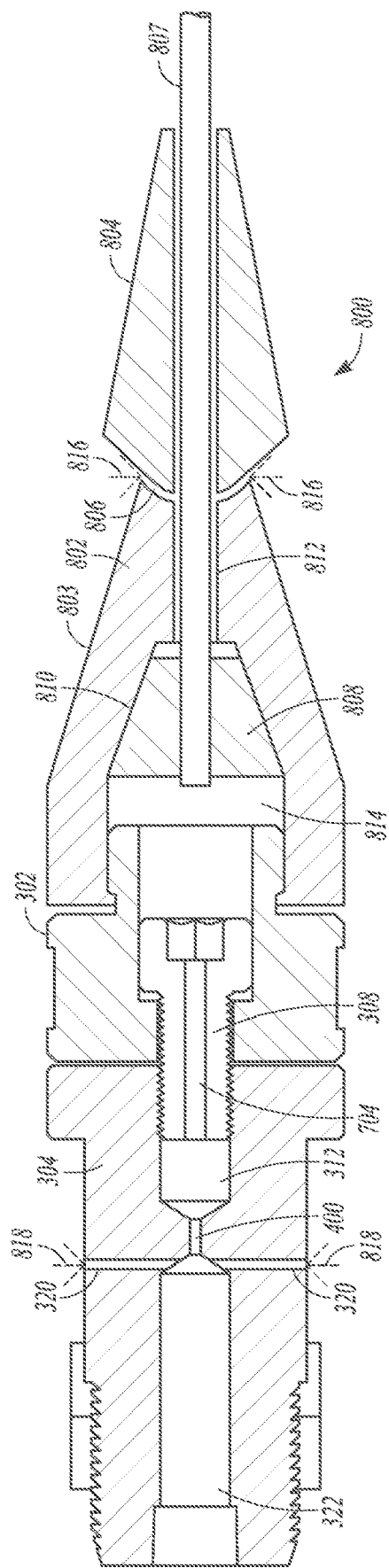
FIG. 8B is a cross-sectional view of the pipe pulling assembly and pipe splitting assembly shown in FIG. 8A.

Referring now to FIG. 8B one example of a cable gripping anchor 808 is shown coupled around a cable 807. As will be described in further detail below, the cable gripping anchor 808 is constructed with a plurality of jaws extending around the cable 807. Engagement of the plurality of jaws with the tapered housing service 810 extending along an interior perimeter of the expander 803 compresses the anchor jaws around the cable 807 and locks the cable 807 longitudinally relative to the pipe splitting assembly 800 and pipe pulling assembly 300. Pulling forces are transmitted from the cable 807 to the pipe splitting assembly 800 and pipe puller assembly 300. The cable 807 extends through a cable lumen 812 toward the cutter 804. The cable 807 extends from a cable anchor recess 814 within the expander 802 through the cutter 804 and from there it is coupled with a pulling apparatus, for instance a wench, to pull the pipe splitting assembly 800 and pipe puller assembly 300 through an existing pipe.

As previously described, the lubricant conduit 322 of the pipe anchor 304 delivers a lubricating fluid to the lubricant passages 320 extending through the pipe anchor 304 to the anchor exterior surface 314. As shown in one example in FIG. 8B the lubricating fluid distributed through the lubricant passages 320 forms pipe puller lubricant jets 818. The pipe puller lubricant jets 818 disperse the lubricating fluid to the exterior of the pipe anchor 304. As the pipe puller assembly 300 is pulled through an existing pipe the lubricant is delivered along the exterior surface of the replacement pipe 108 (see FIGS. 1A, B) and the lubricating fluid decreases the skin friction around the replacement pipe 108 and correspondingly decreases the pulling force needed to pull the pipe puller assembly 300 and replacement pipe 108.

As shown in FIG. 8B, the pipe anchor 304 further includes a second lubricant conduit 400 extending into the anchor lumen 312. The anchor lumen 312 is sized and shaped to receive the anchor bolt 308 including the bolt lubricant conduit 704. As previously described, the bolt lubricant conduit 704 serves as a bridging lubricant conduit between the pipe anchor 304 and the expander coupling 302. Lubricant fluid delivered through the second lubricant conduit 400 into the anchor lumen 312 is delivered through the bolt lubricant conduit 704 into the cable anchor recess 814 of the expander 802. Because the cable grouping anchor 808 is constructed with a plurality of separate anchor jaws the lubricating fluid within the cable anchor recess 814 is able to pass between the anchor jaws and into the cable lumen 812.

In one example the cable 807 has a smaller diameter than the inner diameter of the cable lumen 812 thereby permitting the lubricating fluid under pressure to flow toward the cutter 804. The lubricating fluid is delivered through the cable 812 to the lubricant gap 806 between the cutter 804 and expander 802. Expander lubricant jets 816 are formed that distribute the lubricating fluid over the expander tapered surface 803 of the expander 802. The lubricating fluid delivered through the lubricant gap 806 decreases the skin friction of the expander 802 and further minimizes the pulling forces needed to pull the pipe splitting assembly 800 and pipe puller assembly 300 through an existing pipe and surrounding rock and soil.

Figure 9:
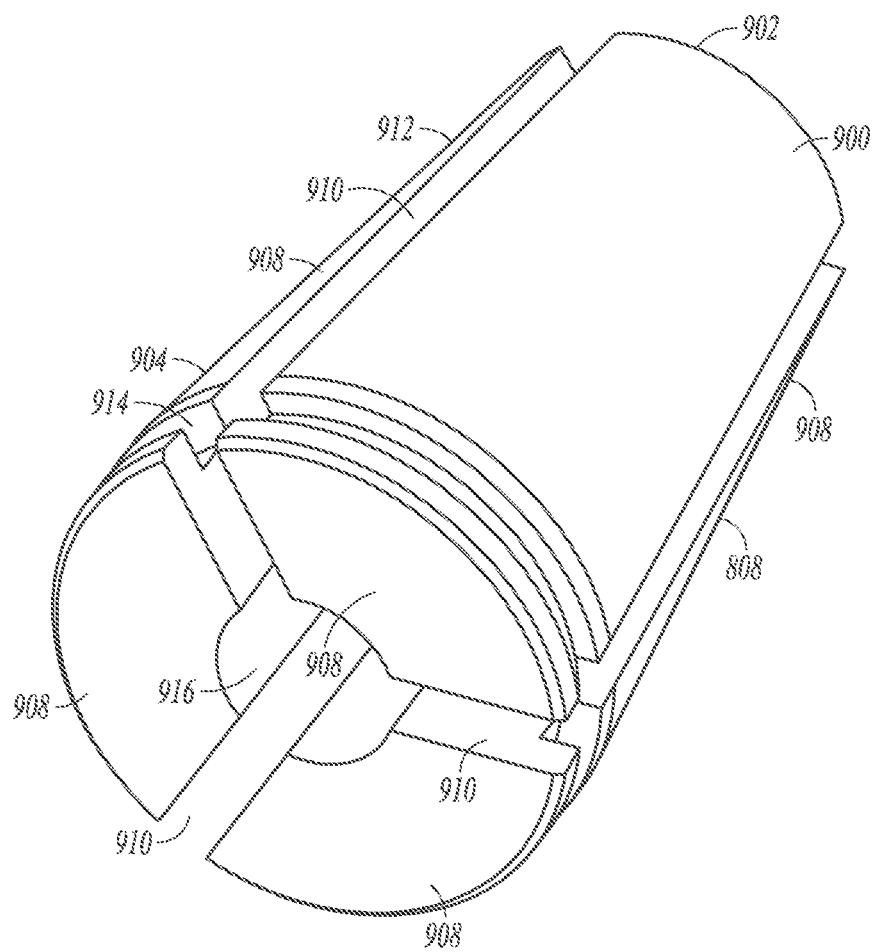
FIG. 9 is a perspective view of one example of a cable gripping anchor.

An example of the cable gripping anchor 808 is shown in FIG. 9. The cable gripping anchor 808 includes an anchor body 900 extending from an anchor proximal end 902 toward an anchor distal end 904. As shown in FIG. 9, the anchor body 900, in one example, is composed of one or more separated anchor jaws 908. The anchor jaws 908 extend around the anchor cable lumen 906 where the cable will extend when the pipe splitting assembly 800 is assembled. The anchor body 900 including the anchor jaws 908 includes a tapered anchor surface 912 having a shape corresponding to the housing tapered surface 810 shown in FIG. 8B. As described in further detail below, the tapered anchor surface 912 is sized and shaped to engage with the housing tapered surface 810 and compress the cable gripping anchor 808 around the cable to lock the assembly of the cable gripping anchor and the expander 802 on the cable. The tapered anchor surface 912 tapers from the anchor distal end 904 toward the anchor proximal end 902.

Near the anchor distal end 904 a retaining band groove 914 extends around the anchor body 900. The retaining band groove 914 is sized and shaped to receive a retaining band, such as an elastomeric band. When the retaining band is positioned within the retaining band groove 914 the separate anchor jaws 908 are retained around the anchor cable lumen 916 and the cable. The retaining band ensures the anchor body 900 remains in an assembled state around the cable before the cable gripping anchor 808 is engaged with the tapered housing surface 810.

In operation, the cable 807 is positioned within the cable gripping anchor 808 (see FIG. 8B). As the cable 807 is pulled proximally, for instance by a rotating spool at one end of an existing pipe, the cable gripping anchor 808 is pulled due to friction between the cable and the interior surface of the anchor engaged along the cable (e.g., through slight engagement caused with a retaining band within the retaining band groove 914). Movement of the cable gripping anchor 808 proximally engages the anchor tapered surface 912 with the housing tapered surface 810. Continued movement of the cable gripping anchor 808 into the tapered housing surface 810 compresses the anchor jaws 908 around the cable and clamps the cable gripping anchor 808 around the cable 807. The cable gripping anchor 808 is locked in place between the cable and the expander 802. The cooperative engagement between the expander 802, anchor 808 and the cable 807 locks the cable in place relative to the cable gripping anchor 808 and the expander. Continued proximal pulling of the cable transmits pulling forces from the cable gripping anchor 808 to the expander 802 and the cutter 804. The pulling forces from the cable are transmitted proximally through the pipe splitting assembly 800 by compression.

As further shown in FIG. 9, the anchor jaws 908 are physically separated to permit compression of the cable gripping anchor 808 around the cable. The separation between adjacent jaws 908 forms lubricant slots 910 configured to deliver lubricant fluid from the pipe pulling assembly 300 to the lubricant gap 806 between the expander 802 and the cutter 804 (See FIGS. 8A, B). As shown in FIG. 8B, the lubricant fluid passes through the cable lumen 812 and is distributed around the expander tapered surface 803 from the lubricant gap 806. The lubricant slots 910 through the cable gripping anchor 808 continue the path between the lubricant conduit 322 where the lubricant fluid enters the pipe pulling assembly 300 and the lubricant gap 806.

Referring to FIG. 8B, lubricating fluid is provided to the pipe pulling assembly 300 and the pipe splitting assembly 800 during a splitting operation. The lubricating fluid is delivered under pressure to the lubricant conduit 322 and distributed through the lubricant passages 320 extending to the anchor exterior surface 314. As shown in FIG. 8B, in one example, the lubricating fluid is delivered under sufficient pressure to generate pipe puller lubricant jets 818. The jets 818 arrayed around the pipe anchor 304 distribute the lubricating fluid over the anchor exterior surface 314. As the pipe pulling assembly 300 is pulled through the existing pipe and surrounding soil or rock, the lubricating fluid is spread over the replacement pipe 108 exterior surface (see FIGS. 1A, B) and minimizes the skin friction of the replacement pipe. The decreased skin friction minimizes the forces needed to pull the pipe pulling assembly through the existing pipe.

Where the anchor bolt 308 is coupled between the expander coupling 302 and the pipe anchor 304 lubricating fluid is also delivered through the bolt lubricant conduit 704 to the expander 802 of the pipe splitting assembly 800. As described above, the lubricating fluid moves through the lubricant slots of the cable gripping anchor 808 and is fed through the cable lumen 812 of the expander 802. The lubricating fluid is distributed to the expander tapered surface 803 through the lubricant gap 806. Where the lubricating fluid is delivered with sufficient pressure expander lubricant jets 816 are formed that distribute the lubricating fluid over the expander tapered surface 803 and the surrounding existing pipe, rock and soil. The lubricating fluid around the expander tapered surface 803 further minimizes the skin friction of the consolidated replacement pipe 108, the pipe pulling assembly 300 and the pipe splitting assembly 800. The anchor bolt 308, the anchor lumen 814, the cable lumen 812, lubricant slots 910 and the lubricant gap 806 form additional portions of the lubricant system of the pipe anchor 304.

Figure 10:
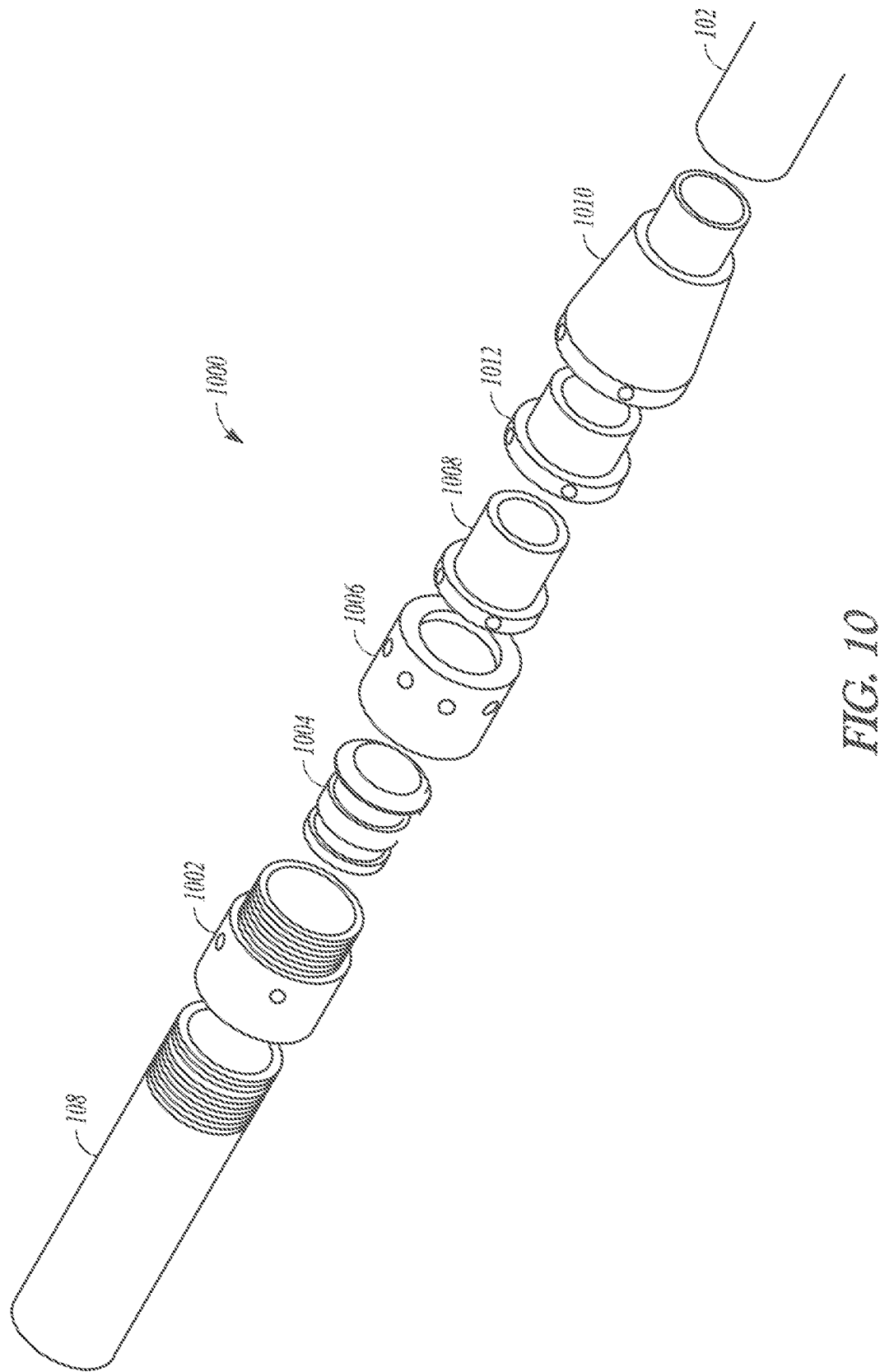
FIG. 10 is an exploded view of one example of a pipe pulling assembly coupled with a pneumatic hammer.

FIG. 10 shows one example of a pipe pulling assembly 1000. The pipe pulling assembly 1000 is configured for coupling with a pneumatic hammer 102 (the pneumatic hammer 102 extends to the right of the page). The pipe pulling assembly 1000 includes a pipe puller 1002 (e.g., a pipe anchor) coupled with the replacement pipe 108. A lubricant distributor 1004 is coupled between the pipe puller 1002 and a first swivel intermediate 1006. The first swivel intermediate 1006 is correspondingly coupled with the second swivel intermediate 1008, and the intermediates 1006, 1008 permit relative rotation between the pipe puller 1002 and lubricant distributor 1004 relative to the expander 1010. As further shown in FIG. 10, the expander 1010 includes an expander coupling 1012 sized and shaped to couple the expander 1010 with the second swivel intermediate 1008.

Figure 11:
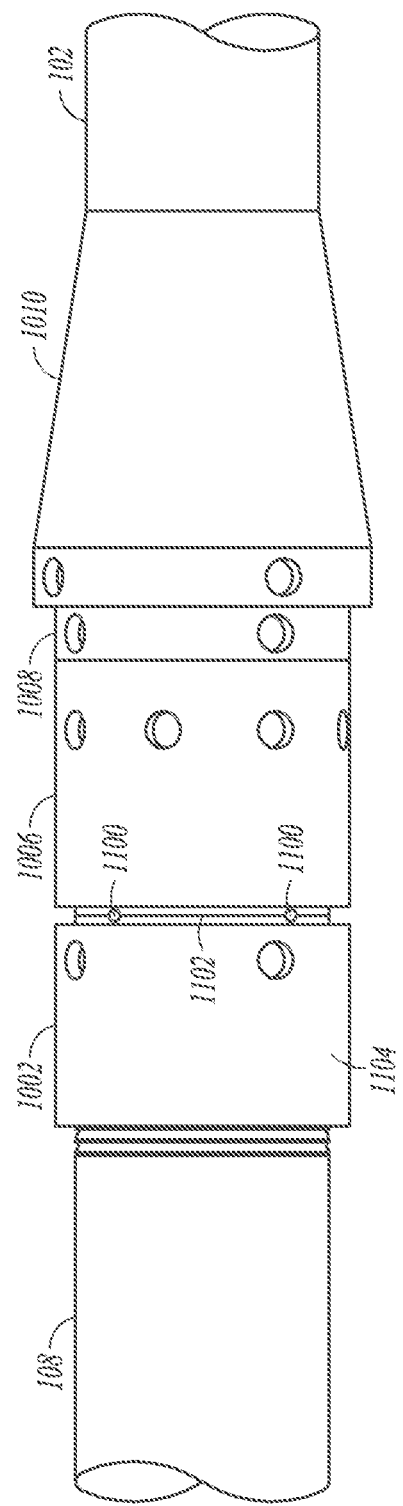
FIG. 11 is a detailed perspective view of the pipe pulling assembly shown in FIG. 10 including lubricant passages.

Referring now to FIG. 11, a detailed view of the pipe pulling assembly 1000 is shown. The components shown in FIG. 10 are assembled in FIG. 11. For instance, the pipe puller 1002 is coupled with the first swivel intermediate 1006 and the first swivel intermediate 1006 is correspondingly coupled with the second swivel intermediate 1008 and the expander 1010. As shown in the example in FIG. 11, the expander 1010 is coupled with the pneumatic hammer 102. The lubricant distributor 1004, shown first in FIG. 10, is coupled within the pipe puller 1002. As will be further described in further detail below, the lubricant distributor 1004 is configured to deliver a lubricant fluid to the pipe puller 1002. The lubricant fluid is distributed through lubricant passages 1100 situated within a lubricant gap 1102 between the pipe puller 1002 and the first swivel intermediate 1006. Delivery of the lubricant fluid through the lubricant passages 1100 and lubricant gap 1102 provides a source of lubricant for the pipe puller exterior surface 1104. As the pipe pulling assembly 1000 is drawn or driven through an existing pipe and surrounding soil and rock, the lubricant fluid delivered to the pipe puller exterior surface 1104 is swept along the replacement pipe 108 and substantially minimizes the skin friction of the replacement pipe as well as the skin friction of the pipe puller 1002 thereby decreasing the forces needed to move the pipe pulling assembly 1000 through an existing pipe and surrounding rock and soil.

Figure 12A:
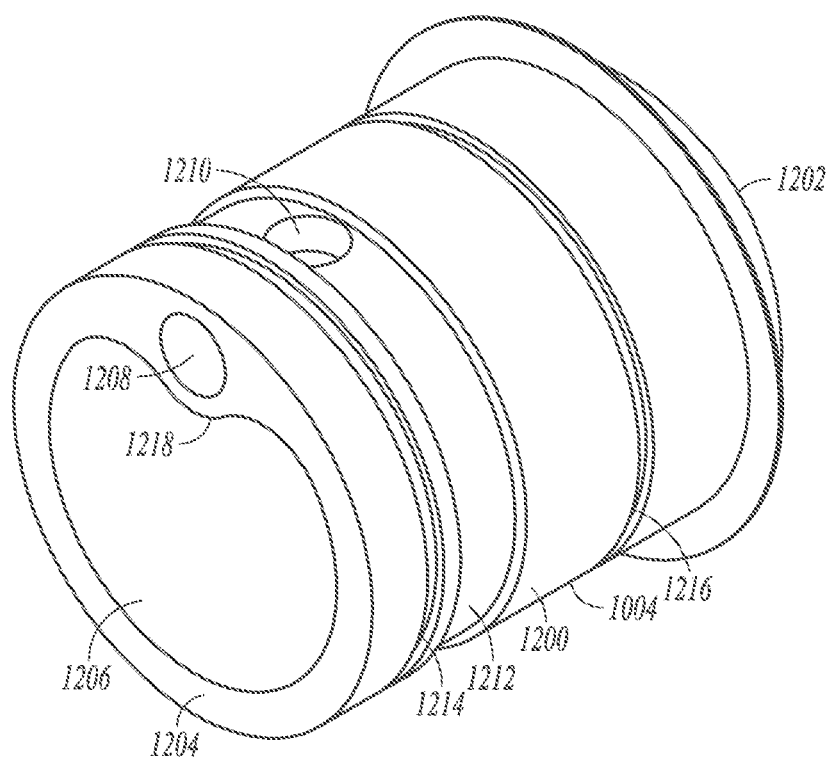
FIG. 12A is a perspective rear view of one example of a lubricant distributor.
Figure 12B:
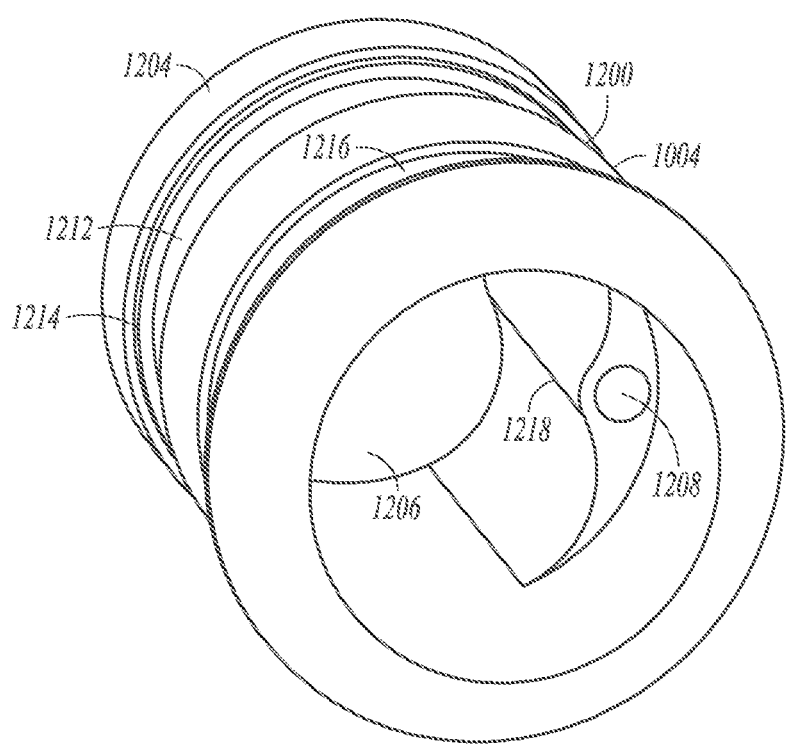
FIG. 12B is a perspective front view of the lubricant distributor shown in FIG. 12A.
Figure 12C:
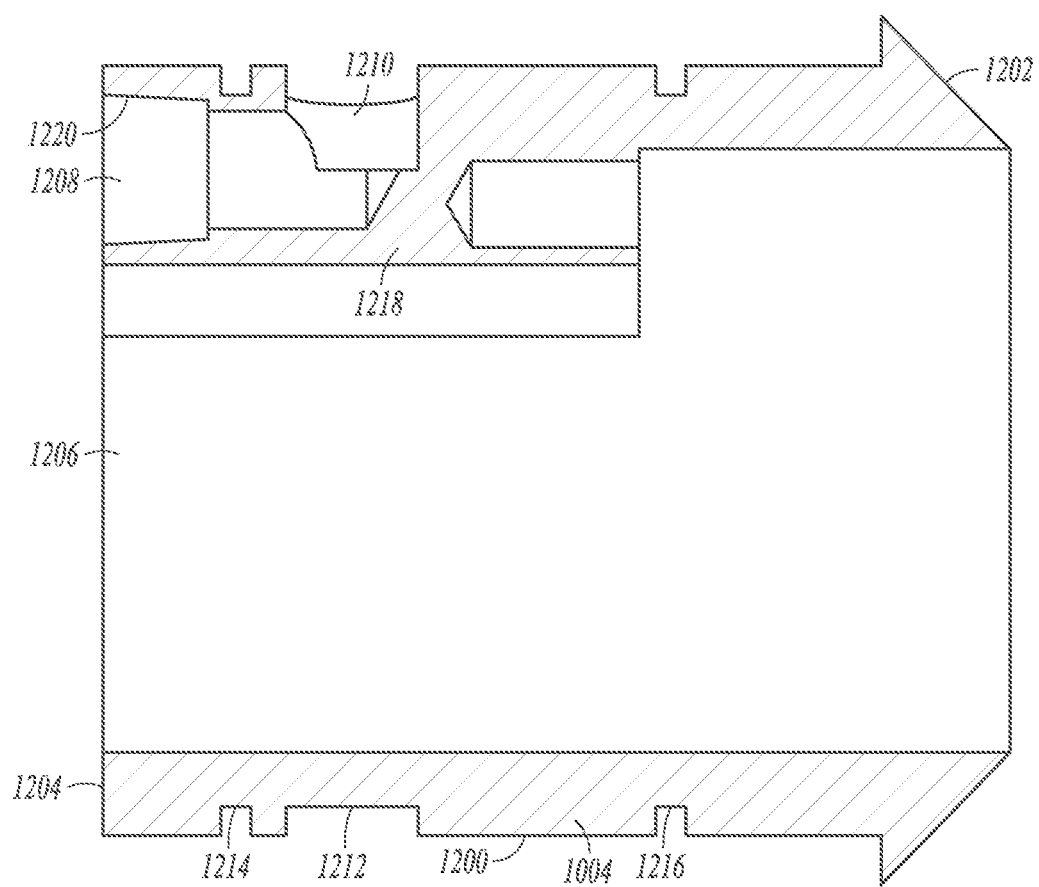
FIG. 12C is a cross-sectional view of the lubricant distributor shown in FIG. 12A.

FIGS. 12A-C show one example of a lubricant distributor 1004. As shown in FIG. 12A, the lubricant distributor 1004 includes a distributor body 1200 extending between a distributor proximal end 1202 and distributor distal end 1204. A pneumatic lumen 1206 extends through the lubricant distributor from the distributor proximal end 1202 to the distributor distal end 1204. The pneumatic lumen 1206, in one example, is sized and shaped to receive a compressed air line for coupling with a pneumatic hammer, such as pneumatic hammer 102 shown in FIGS. 1A and 10. Optionally, the pneumatic lumen 1206 is sized and shaped to act as a pneumatic conduit and thereby directly delivers compressed air to the pneumatic hammer for operation of the hammer. As shown in FIGS. 12A-C, a lubricant conduit 1208 extends from the distributor distal end 1204 toward a lubricant discharge 1210. The lubricant discharge 1210 extends from the interior of the lubricant distributor 1004 through the exterior of the lubricant distributor.

Referring to FIGS. 12B and 12C, the lubricant conduit 1208 and the lubricant discharge 1210 are formed within a lubricant conduit housing 1218. As shown, the lubricant conduit housing 1218 forms a portion of the side wall of the lubricant distributor 1004. By forming the lubricant conduit 1208 and lubricant discharge 1210 in the side wall of the lubricant distributor 1004 the lubricant conduit 1208 is moved substantially away from the center portion of the lubricant distributor thereby providing a large open cavity in the pneumatic lumen 1206 for provision of a pneumatic line for coupling with the pneumatic hammer 102.

As shown in FIG. 12C, the lubricant conduit 1208 further includes a lubricant line connector 1220. The lubricant line connector 1220 is sized and shaped to engage with and fix a lubricant line connected with the lubricant distributor 1004. For example, a quick connect connector is threaded into the lubricant line connector 1220 and a lubricant line is coupled with the quick connector and provides a sealed delivery path from the lubricant line through the lubricant conduit 1208 and lubricant discharge 1210 to deliver lubricating fluid to the exterior of the distributor body 1200.

Referring again to FIGS. 12A-C, the distributor body 1200 includes a lubricant groove 1212 extending around the distributor body. The lubricant groove 1212 is substantially aligned with the lubricant discharge 1210 and is sized and shaped to distribute lubricating fluid from the lubricant discharge 1210 around the distributor body 1200 for discharge through the lubricant passages 1100 of the pipe puller 1002 as shown in FIG. 11. The lubricant conduit 1208, the lubricant discharge 1210, the lubricant groove 1212 and the lubricant passages 1100 are part of a lubricant system formed by the lubricant distributor 1004 and the pipe puller 1002.

In one example, the distributor body 1200 includes O-ring grooves 1214, 1216 positioned distally and proximally relative to the lubricant discharge 1210. The O-ring grooves 1214, 1216 are sized and shaped to receive O-rings. The O-rings coupled between the lubricant distributor 1004 and the pipe puller 1002 provide a continuous sealed channel extending around the distributor body 1200 and the interior of the pipe puller 1002. Pressurized lubricating fluid delivered to the lubricant discharge 1210 is thereby correspondingly delivered through the lubricant passages 1100 aligned with the lubricant groove 1212 without appreciable leaking between the pipe puller and the lubricant distributor.

Figure 13:
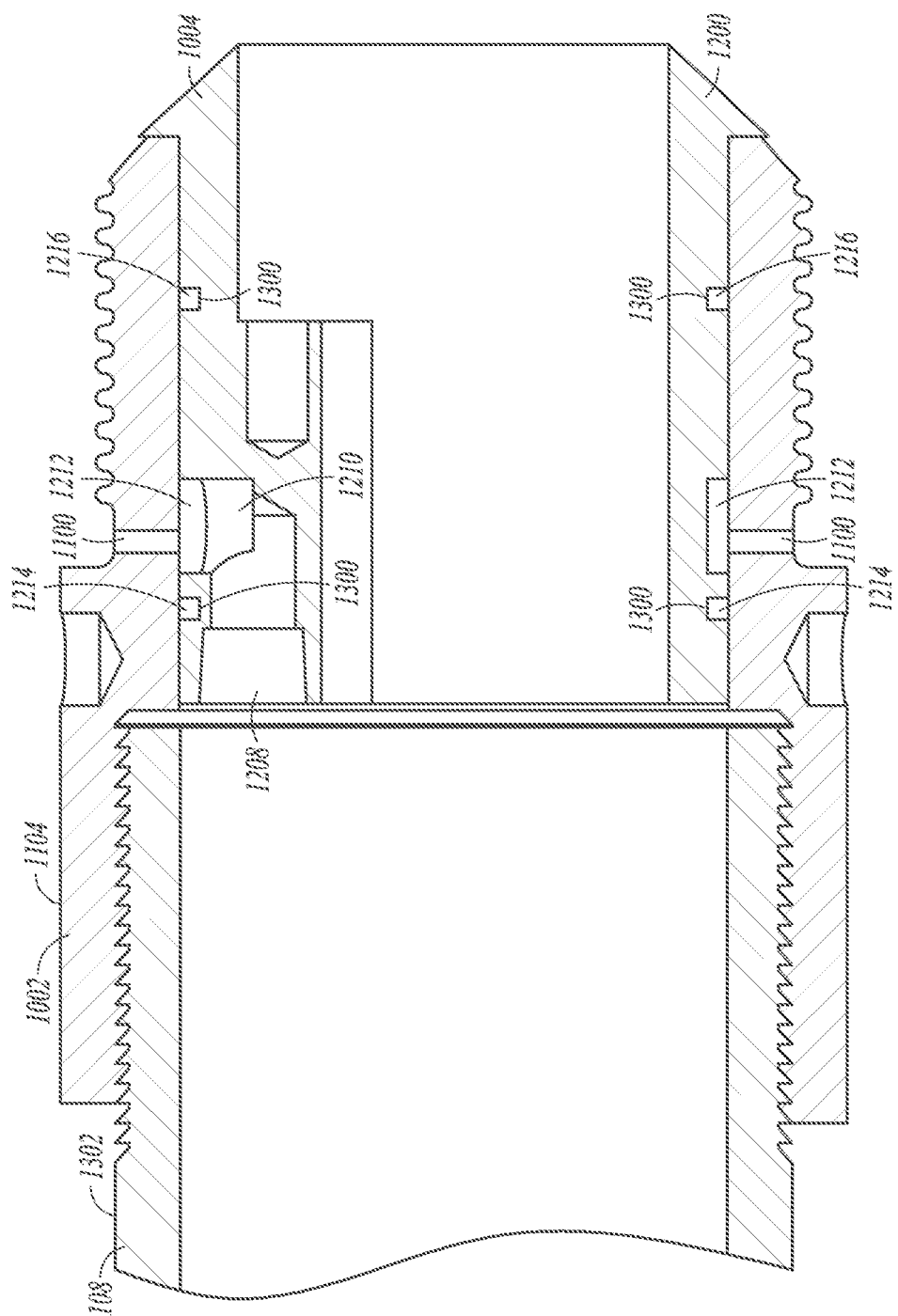
FIG. 13 is a cross-sectional view of the lubricant distributor shown in FIG. 12A coupled with one example of a pipe puller and a replacement pipe.

FIG. 13 shows the lubricant distributor 1004 assembled with the pipe puller 1002 and the replacement pipe 108. As shown, the lubricant discharge 1210 and the lubricant groove 1212 are aligned with the lubricant passages 1100 extending through the pipe puller 1002. Lubricating fluid is delivered through the lubricant discharge 1210 to the lubricant groove 1212. The lubricating fluid is distributed around the lubricant distributor 1004 according to the length of the lubricant groove 1212. Stated another way, where the lubricant groove 1212 extends over a portion of the distributor body 1200 the lubricant within the groove will only be distributed to that portion of the distributor body exterior. Correspondingly, lubricant passages 1100 aligned with the lubricant groove 1212 extending over the limited portion of the distributor body 1200 will receive lubricating fluid. In one example where the pipe puller 1104 includes one or a few lubricant passages 1100 presented over only a portion of a perimeter of the pipe puller 1004 the lubricant groove 1212 and the distributor body 1200 is formed with a length substantially corresponding to the positioning of the lubricant passages 1100 on the pipe puller 1002. Optionally, the O-ring grooves 1214, 1216 positioned proximally and distally to the lubricant groove 1212 include O-rings 1300 positioned therein. The O-rings 1300 extend between the distributor body 1200 and the pipe puller 1002 and form a sealed area between the O-rings 1300. The sealed area substantially prevents the passage of lubricating fluid from outside the lubricant groove 1212 and forces any pressurized lubricating fluid out of the groove 1212 and into the lubricant passages 1100 of the pipe puller 1002.

In operation, where lubricating fluid is delivered to the lubricant conduit 1208 the lubricating fluid is under pressure and is delivered through the lubricant discharge 1210 into the lubricant groove 1212. Lubricating fluid is delivered from the lubricant groove 1212 through the lubricant passages 1100 of the pipe puller 1002. The lubricating fluid passes over the pipe puller exterior surface 1104. As the pipe pulling assembly 1000 (FIG. 10) is pulled though an existing pipe, soil and rock the lubricating fluid on the pipe puller exterior surface 1104 is distributed along the pipe puller exterior surface and onto the replacement pipe exterior surface 1302. The lubricating fluid substantially minimizes the skin friction of the pipe puller 1002 and the replacement pipe 108. Forces needed to pull the pipe pulling assembly 1000 through the existing pipe are thereby correspondingly minimized as well. Lodging and snagging of the pipe pulling assembly 1000 and a pipe splitting assembly coupled with the pipe pulling assembly are thereby substantially minimized.

Conclusion

The pulling lubrication systems described herein provide systems and methods for applying lubricant to portions of the pipe pulling or splitting assemblies and the replacement piping pulled behind such assemblies. Lubricating of one of the replacement piping decreases the skin friction of the replacement pipe and decreases forces needed to pull the replacement piping through the existing piping and the surrounding soil and rock. Additionally, the lubricating systems minimize seizing of the replacement piping, the splitting assembly or pulling assembly within the surrounding existing pipe and soil. Costly excavation to retrieve the lodged assemblies and delays in the pipe replacement process are correspondingly minimized. Moreover, the lubricating systems apply lubricating fluids to the exteriors of one or more of the pipe splitting assembly or the pipe pulling assembly to further minimize the skin friction of the entire system and further minimize seizing of the system.

The lubrication systems and methods described herein distribute lubricating fluids over the perimeter of at least one of the pipe pulling assembly or pipe splitting assembly. The lubrication systems accomplish the distribution by using a array of lubricant passages, grooves and the like that extend around at least one component of an assembly and correspondingly deliver the lubricant fluid over the perimeter of the component. Optionally, the lubricant passages direct the lubricant fluid into lubricant jets that deliver lubricating fluid to the surrounding existing piping, soil and rock as well as the replacement pipe and the assembly to minimize friction between the components and facilitate the splitting operation.

Although the present invention has been described in reference to preferred embodiments, persons skilled in the art will recognize that changes may be made in form and detail without departing from the spirit and scope of the invention. It is to be understood that the above description is intended to be illustrative, and not restrictive. Many other embodiments will be apparent to those of skill in the art upon reading and understanding the above description. It should be noted that embodiments discussed in different portions of the description or referred to in different drawings can be combined to form additional embodiments of the present application. The scope of the invention should, therefore, be determined with reference to the appended claims, along with the full scope of equivalents to which such claims are entitled.

What is claimed is:

1. A pipe breaking assembly, comprising:
a housing, having an internal tapered housing surface;
a cable gripping anchor including a number of tapered anchor jaws that are movable against the tapered housing surface;
a pipe splitter having a front opening for a pulling cable, the pipe splitter located in front of the housing;
a replacement pipe coupling located at a back end of the housing, the replacement pipe coupling adapted to hold a trailing replacement pipe; and
a lubricant passage exiting the pipe breaking assembly from between moving components of a rotating joint located between the pipe splitter and the housing.

2. The pipe breaking assembly of claim 1, wherein the lubricant passage is routed alongside at least a portion of the pulling cable when in use.

3. The pipe breaking assembly of claim 1, wherein the lubricant passage includes an internal bolt including a fluid passage through a middle portion of the bolt.

4. The pipe breaking assembly of claim 1, wherein the lubricant passage further includes one or more lubricant ports exiting a side of the replacement pipe coupling.

5. The pipe breaking assembly of claim 1, wherein the housing includes an expander.

6. A pipe breaking assembly, comprising:
a pipe splitter including one or more splitting blades;
a replacement pipe coupling located behind the pipe splitter, the replacement pipe coupling adapted to hold a trailing replacement pipe;
an internal bolt threaded into the replacement pipe coupling from an adjacent passage, wherein the bolt includes a fluid passage through a middle portion of the bolt, wherein the internal bolt is a component in a lubricant passage between an interior of the replacement pipe coupling to one or more first lubricant ports exiting a side of the pipe breaking assembly.

7. The pipe breaking assembly of claim 6, further including a lubricant line connector on an inside of the replacement pipe coupling for connection within an interior of the trailing replacement pipe.

8. The pipe breaking assembly of claim 7, wherein the lubricant line connector is located against a sidewall of the replacement pipe coupling.

9. The pipe breaking assembly of claim 6, wherein the lubricant passage further includes a second lubricant port exiting the pipe breaking assembly at a rotating joint located between the pipe splitter and a housing.

10. The pipe breaking assembly of claim 9, wherein the housing includes an expander.

11. A pipe breaking assembly, comprising:
a housing, having an internal tapered housing surface;
a cable gripping anchor including a number of tapered anchor jaws that are movable against the tapered housing surface, the number of tapered anchor jaws defining gaps between adjacent tapered anchor jaws;
a pipe splitter having a front opening for a pulling cable, the pipe splitter located in front of the housing;
a replacement pipe coupling located at a back end of the housing, the replacement pipe coupling adapted to hold a trailing replacement pipe;
a lubricant system including;
a lubricant inlet on a first side of the cable gripping anchor;
a lubricant outlet on an opposing side of the cable gripping anchor, wherein when in operation, the lubricant system is configured to pass lubricant from the lubricant inlet, through the gaps between adjacent tapered anchor jaws, and out the lubricant outlet.

12. The pipe breaking assembly of claim 11, wherein the lubricant system includes a lubricant line connector on an inside of the replacement pipe coupling for connection within an interior of the trailing replacement pipe.

13. The pipe breaking assembly of claim 12, wherein the lubricant line connector is located against a sidewall of the replacement pipe coupling.

14. The pipe breaking assembly of claim 11, wherein the lubricant system includes an internal bolt threaded into the replacement pipe coupling from an adjacent passage, wherein the bolt includes a fluid passage through a middle portion of the bolt.

15. The pipe breaking assembly of claim 11, wherein the lubricant system includes a lubricant port exiting the pipe breaking assembly at a rotating joint located between the pipe splitter and a housing.

* * * * *